United States Patent [19]

Hashiguchi et al.

[11] Patent Number: 4,970,650
[45] Date of Patent: Nov. 13, 1990

[54] TRACTION CONTROL APPARATUS

[75] Inventors: Masayuki Hashiguchi, Oobu; Kiichi Yamada, Nagoya; Masayoshi Ito, Okazaki; Atsuhiro Kawano, Oobu; Susumu Nishikawa, Okazaki; Takeshi Funakoshi, Oobu; Shuji Ikeda, Okazaki, all of Japan

[73] Assignee: Mitsubishi Jidosha Kogyo Kabushiki Kaisha, Tokyo, Japan

[21] Appl. No.: 339,701

[22] Filed: Apr. 18, 1989

[30] Foreign Application Priority Data

| Apr. 20, 1988 | [JP] | Japan | 63-97274 |
| Apr. 20, 1988 | [JP] | Japan | 63-97281 |
| Sep. 5, 1988 | [JP] | Japan | 63-221603 |
| Sep. 5, 1988 | [JP] | Japan | 63-221604 |
| Sep. 5, 1988 | [JP] | Japan | 63-221608 |

[51] Int. Cl.$^5$ ............................................. B60T 8/58
[52] U.S. Cl. ................... 364/426.02; 180/197; 303/103; 303/106
[58] Field of Search ............... 364/426.03, 426.02; 180/197; 303/100, 102, 103, 106, 112

[56] References Cited

U.S. PATENT DOCUMENTS

| 4,637,487 | 1/1987 | Nakamura et al. | 180/197 |
| 4,657,313 | 4/1987 | Fennel et al. | 303/100 |
| 4,681,373 | 7/1987 | Nomura et al. | 303/106 |
| 4,681,374 | 7/1987 | Nakamura et al. | 180/197 |
| 4,685,547 | 8/1987 | Ohashi et al. | 180/197 |
| 4,718,735 | 1/1988 | Ogino | 303/103 |
| 4,722,411 | 2/1988 | Ohashi et al. | 180/197 |
| 4,733,760 | 3/1988 | Inagaki et al. | 180/197 |
| 4,760,893 | 8/1988 | Sigl et al. | 180/197 |
| 4,765,691 | 8/1988 | Inoue et al. | 180/197 |
| 4,766,972 | 8/1988 | Takata et al. | 303/100 |
| 4,802,711 | 2/1989 | Muto et al. | 364/426.02 |

Primary Examiner—Gary Chin
Attorney, Agent, or Firm—Hedman, Gibson, Costigan & Hoare

[57] ABSTRACT

A first slip value detecting section detects slip values of the driving wheels on the basis of differences between the outputs from a selected driving wheel velocity and a reference velocity. And a second slip value detecting section detects slip values of the driving wheels on the basis of differences between the outputs from a driving wheel velocity detecting section and the reference velocity. And an engine output is controlled in accordance with the slip values detected by the first slip value detecting section. And braking force is controlled in accordance with the slip values detected by the second slip value detecting section.

17 Claims, 26 Drawing Sheets

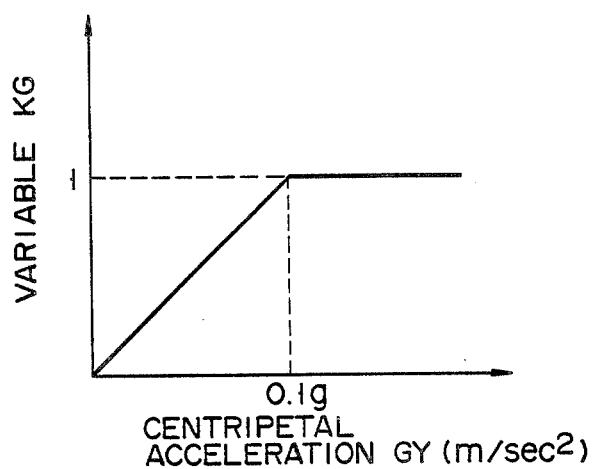
F I G. 19
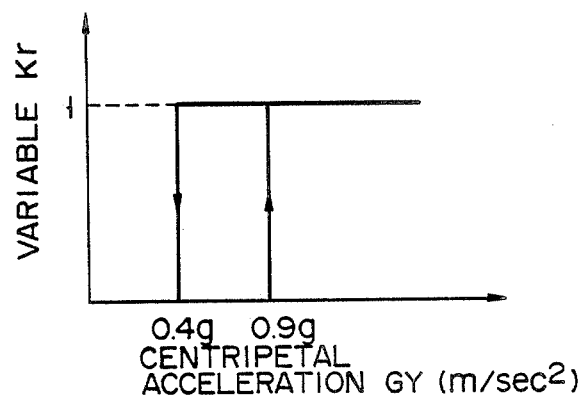
F I G. 20

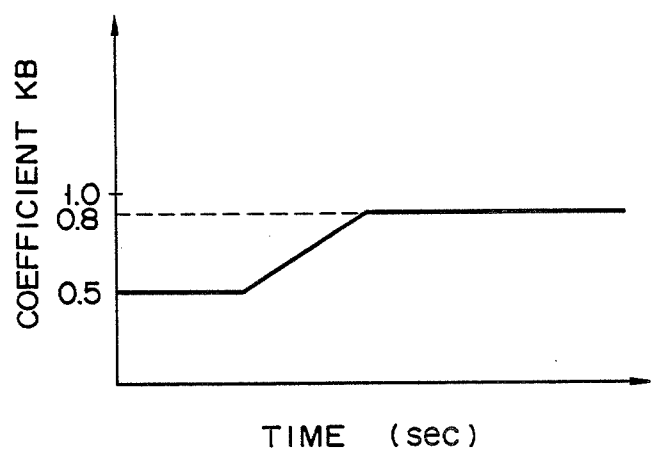
F I G. 29
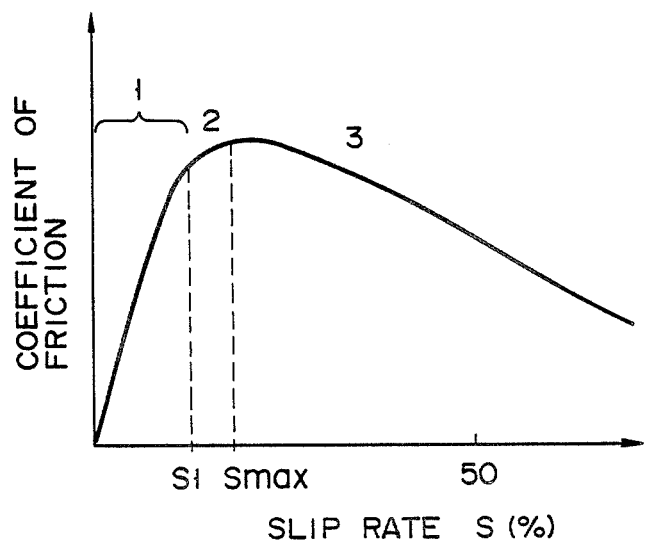
F I G. 31

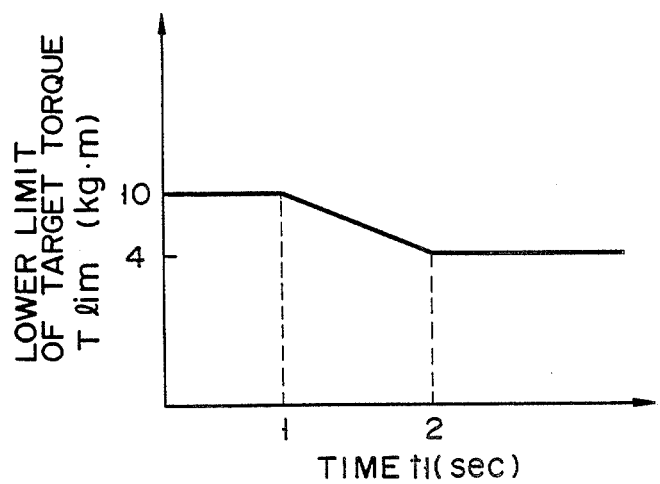
F I G. 32
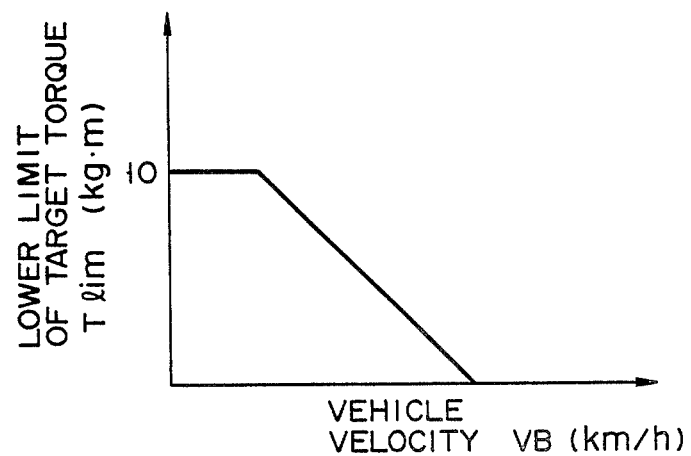
F I G. 33

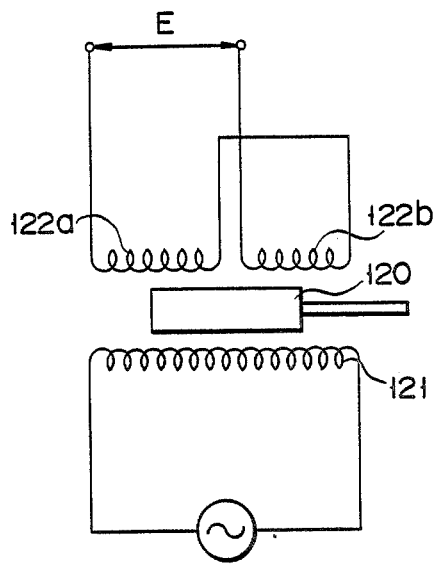
F I G. 37
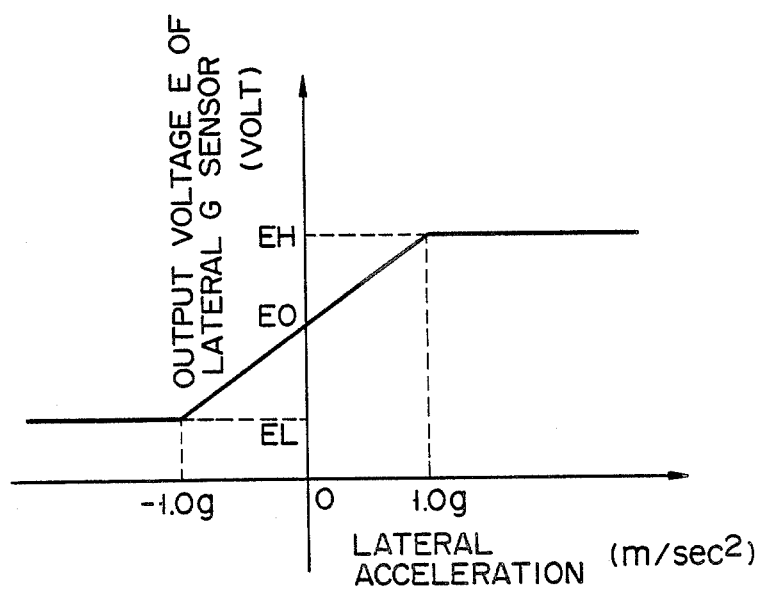
F I G. 38

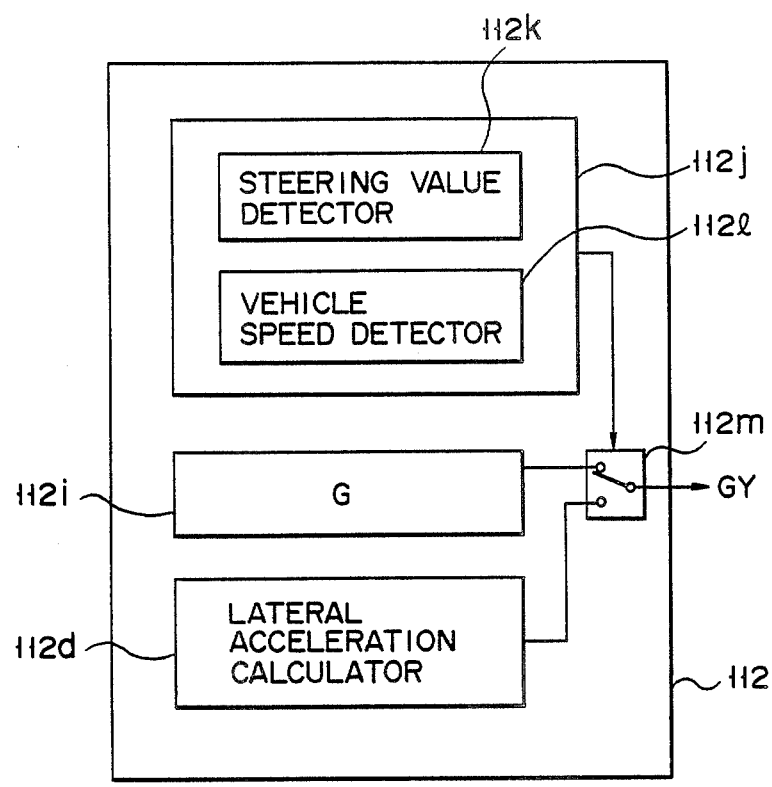
F I G. 39

TRACTION CONTROL APPARATUS

BACKGROUND OF THE INVENTION

1. Field of the Invention

The present invention relates to a traction control apparatus for preventing slippage of driving wheels in an acceleration state.

2. Description of the Related Art

An apparatus for preventing slippage of driving wheels of a vehicle in an acceleration state, as disclosed in U.S. Pat. No. 4,637,487, or the like, is known. In such an apparatus, a main throttle valve whose opening is controlled in cooperation with an accelerator pedal and a sub throttle valve whose opening is electrically controlled are arranged in an air intake path of an engine. When slippage of driving wheels is detected, the opening of the sub throttle valve is controlled to be decreased, thereby reducing an engine output, and eliminating slippage of the driving wheels.

However, in this apparatus, when slippage of driving wheels is detected, the engine output is reduced to prevent slippage of driving wheels, as described above. When slippage of the driving wheels is no longer detected and control for reducing the engine output is stopped, slippage of the driving wheels occurs again.

SUMMARY OF THE INVENTION

It is an object of the present invention to provide a traction control apparatus wherein when slippage of driving wheels is detected, the driving wheels are braked, a engine output is controlled in accordance with the slip values of the driving wheels.

According to the present invention, a traction control apparatus comprises:

acceleration slippage detecting means for, when it is detected that acceleration slippage occurs in driving wheels of a vehicle, outputting an engine control start instruction and/or a braking control start instruction;

drive state detecting means for detecting a drive state of the vehicle;

driving wheel velocity detecting means for detecting left and right driving wheel velocities of the vehicle;

driving wheel velocity selecting means for selecting and outputting a driving wheel velocity calculated using the left and right driving wheel velocities on the basis of an output from said driving wheel velocity detecting means or one of the left and right driving wheel velocities in accordance with an output from said drive state detecting means on the basis of the output from said driving wheel velocity detecting means;

driven wheel velocity detecting means for detecting a driven wheel velocity of the vehicle;

reference velocity setting means for setting a reference velocity on the basis of an output from said driven wheel velocity detecting means;

first slip value detecting means for detecting slip values of the driving wheels on the basis of differences between the outputs from said driving wheel velocity selecting means and an output from said reference velocity setting means;

engine output control means for controlling an engine output of the vehicle in accordance with the slip values detected by said first slip value detecting means upon reception of the engine control start instruction;

second slip value detecting means for detecting slip values of the driving wheels on the basis of differences between the outputs from the driving wheel velocity detecting means and the output from said reference velocity setting means; and braking force control means for controlling braking forces of the driving wheels in accordance with the slip values detected by said second slip value detecting means upon reception of the braking control start instruction.

According to the present invention, when slippage of driving wheels is detected, the driving wheels are braked, a engine output is controlled in accordance with the slip values of the driving wheels. Therefore, a traction control apparatus with high accuracy can be provided.

BRIEF DESCRIPTION OF THE DRAWINGS

FIG. 19 is a graph showing the relationship between a centripetal acceleration GY and a variable KG;

FIG. 20/is a graph showing the relationship between the centripetal acceleration GY and a variable Kr;

FIG. 29 is a graph showing a change in coefficient KB after traction control is started;

FIGS. 31 and 34 are graphs showing the relationship between a slip rate S and a friction coefficient μ of a road surface;

FIG. 32 is a graph showing the relationship between a lower limit Tlim of a target engine torque and a time (t1) after traction control is started;

FIG. 33 is a graph showing the relationship between the vehicle velocity VB and the lower limit Tlim of the target engine torque;

FIG. 37 is a circuit diagram showing the principle of a differential transformer type G sensor;

FIG. 38 is a graph showing an output voltage of a lateral G sensor; and

FIG. 39 is a drive state detecting means.

DETAILED DESCRIPTION OF THE PREFERRED EMBODIMENTS

Figure 1A:
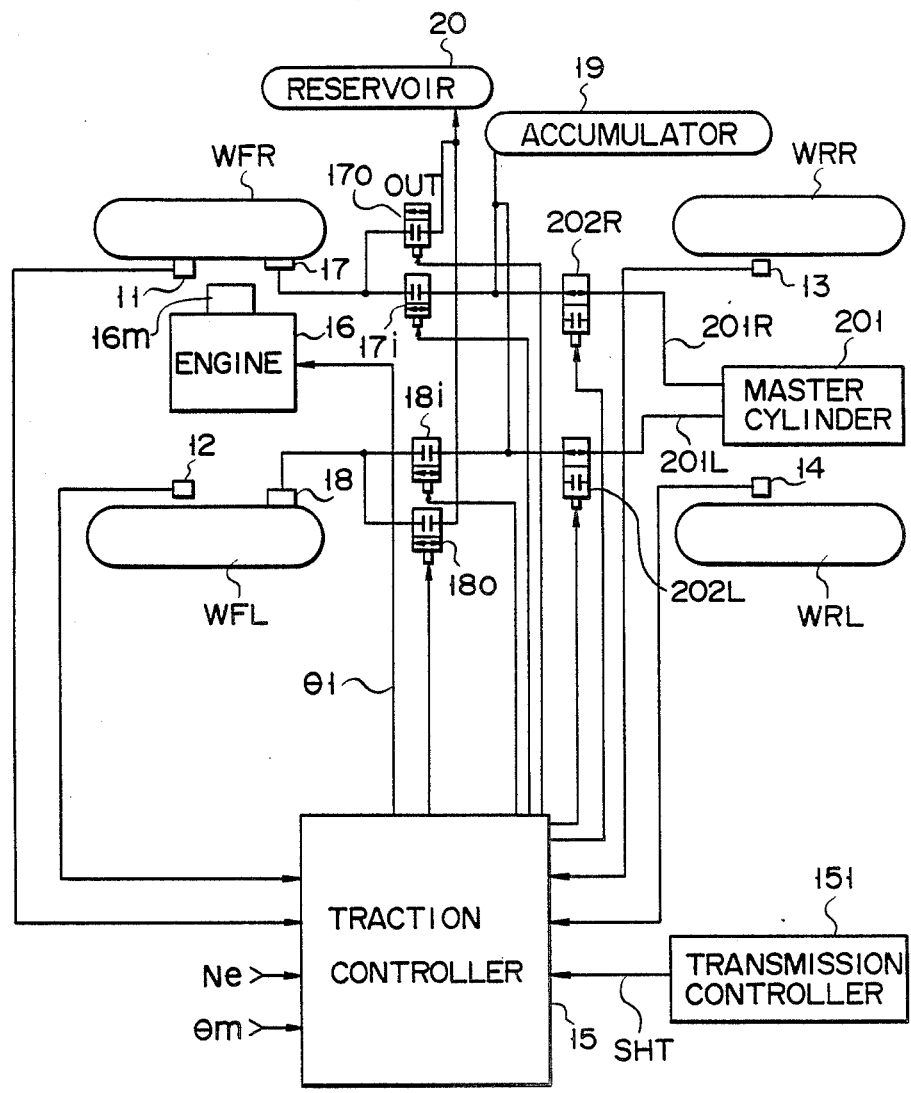
FIG. 1A is a diagram showing an overall arrangement of a traction control apparatus according to a first embodiment of the present invention.
Figure 16:
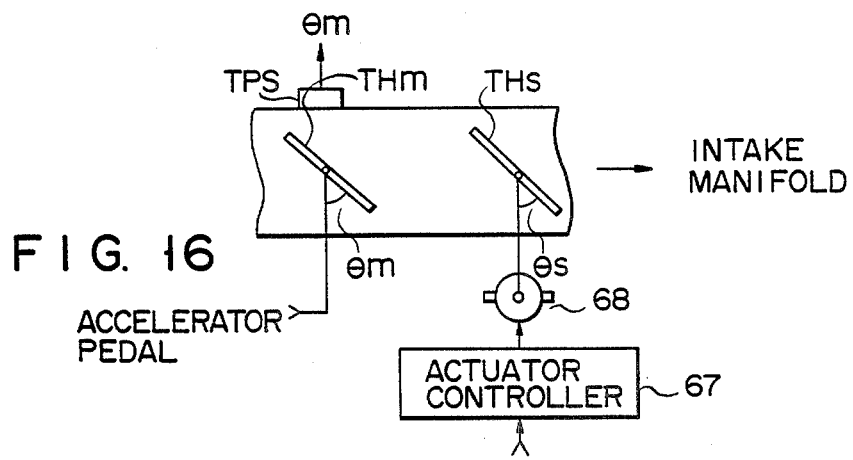
FIG. 16 is a view showing the arrangement of the main throttle valve THm and a sub throttle valve THs.

A traction control apparatus for a vehicle according to a first embodiment of the present invention will now be described with reference to the accompanying drawings. FIG. 1A is a diagram showing a traction control apparatus for a vehicle. FIG. 1A illustrates a front-wheel drive vehicle. In FIG. 1A, reference symbol WFR denotes a front right wheel; WFL, a front left wheel; WRR, a rear right wheel; and WRL, a rear left wheel. Reference numeral 11 denotes a wheel velocity sensor for detecting a wheel velocity VFR of the front right wheel (driving wheel) WFR; 12, a wheel velocity sensor for detecting a wheel velocity VFL of the front left wheel (driving wheel) WFL; 13, a wheel velocity sensor for detecting a wheel velocity VRR of the rear right wheel (driven wheel) WRR; and 14, a wheel velocity sensor for detecting a wheel velocity VRL of the rear left wheel (driven wheel) WRL. The wheel velocities VFR, VFL, VRR, and VRL detected by the wheel velocity sensors 11 to 14 are input to a traction controller 15. The traction controller 15 performs control of preventing slippage of driving wheels in an acceleration state. An engine 16 has a main throttle valve THm and a sub throttle valve THs, as shown in FIG. 16. In a normal drive mode, the main throttle valve THm is operated by an accelerator pedal to adjust an engine output. In a traction control mode, a throttle opening θs of the sub throttle valve THs is controlled to control the engine output. Reference numeral 17 denotes a wheel cylinder for braking the front right wheel WFR; and 18, a wheel cylinder for braking the front left wheel WFL. Supply of a pressurized oil from an accumulator 19 to the wheel cylinder 17 is performed through an inlet valve 17i, and exhaustion of the pressurized oil from the wheel cylinder 17 to a reservoir 20 is performed through an outlet valve 17o. Supply of the pressurized oil from the accumulator 19 to the wheel cylinder 18 is performed through an inlet valve 18i, and exhaustion of a pressurized oil from the wheel cylinder 18 to the reservoir 20 is performed through an outlet valve 18o. A normally-open right shut valve 202R is arranged on a right oil path 201R between a master cylinder 201 and the inlet valve 17i, and a normally-open left shut valve 202L is arranged on a left oil path 201L between the master cylinder 201 and the inlet valve 18i. The inlet valves 17i and 18i and the outlet valves 17o and 18o and shut valves 202R and 202L are open/close-controlled by the traction controller 15.

The traction controller 15 receives a shift signal SHT from a transmission controller 151 for controlling switching of shift positions of an automatic transmission 16m. The SHT signal indicates a shift position of the automatic transmission 16m. The traction controller 15 also receives an engine speed signal Ne of the engine and an opening signal θm of the main throttle valve THm shown in FIG. 16.

Figure 1B:
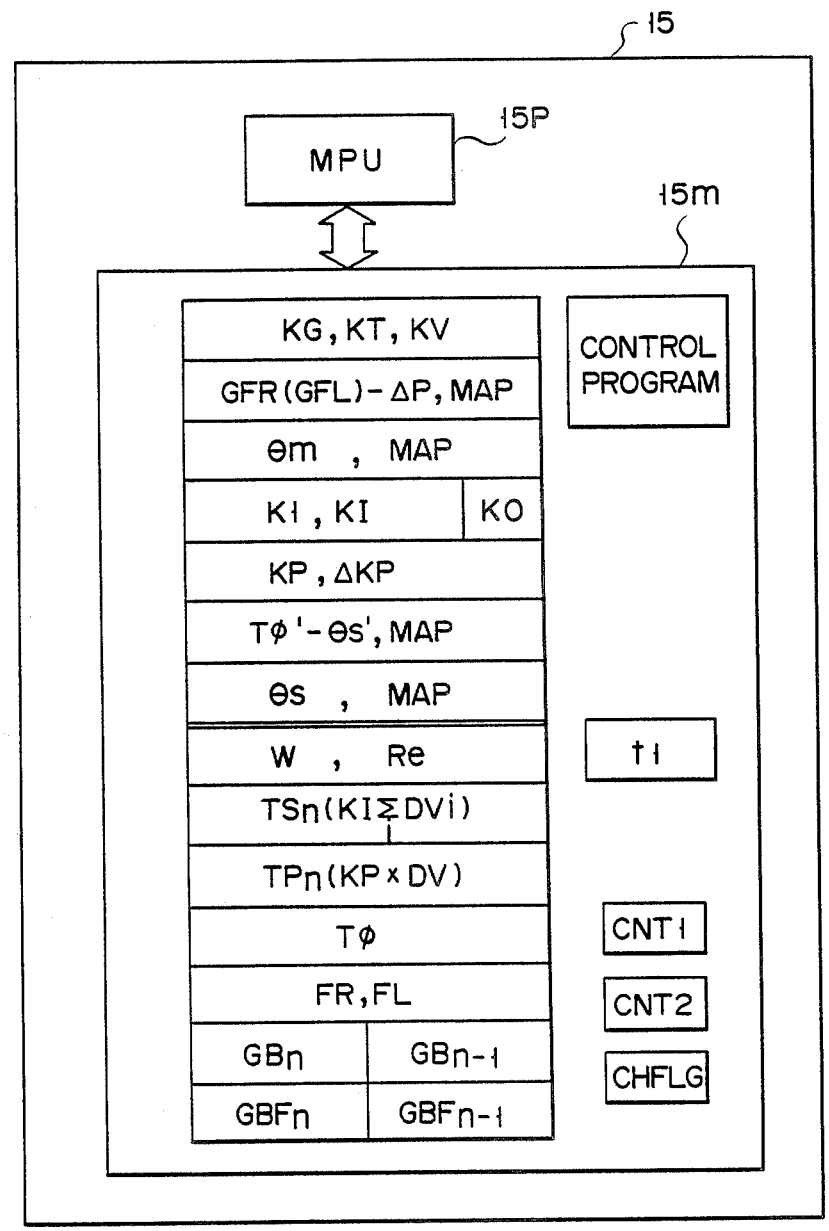
FIG 1B is a diagram showing a detailed arrangement of a traction controller shown in FIG. 1A.

The detailed arrangement of the traction controller 15 shown in FIG. 1A will now be described with reference to FIG. 1B. The traction controller 15 comprises an MPU (micro processor unit) 15p including various registers, an ALU (arithmetic and logic unit), and the like, a memory 15m for storing a traction control program, various maps, coefficient data, variable data, counters, and flags, and the like.

Figure 2A:
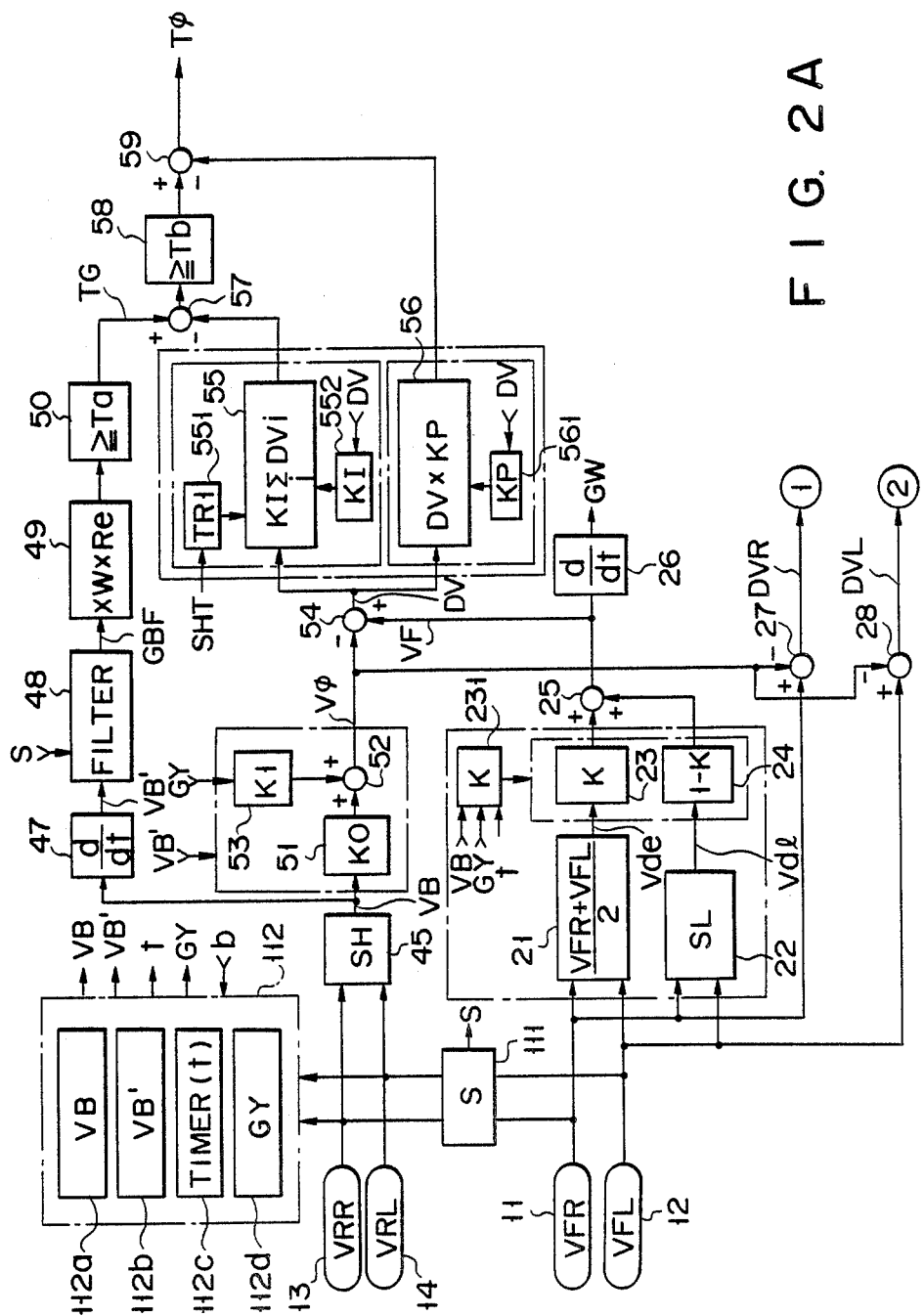
FIGS. 2A to 2C are block diagrams showing control of the traction controller shown in FIG. 1A in units of functional blocks.
Figure 2B:
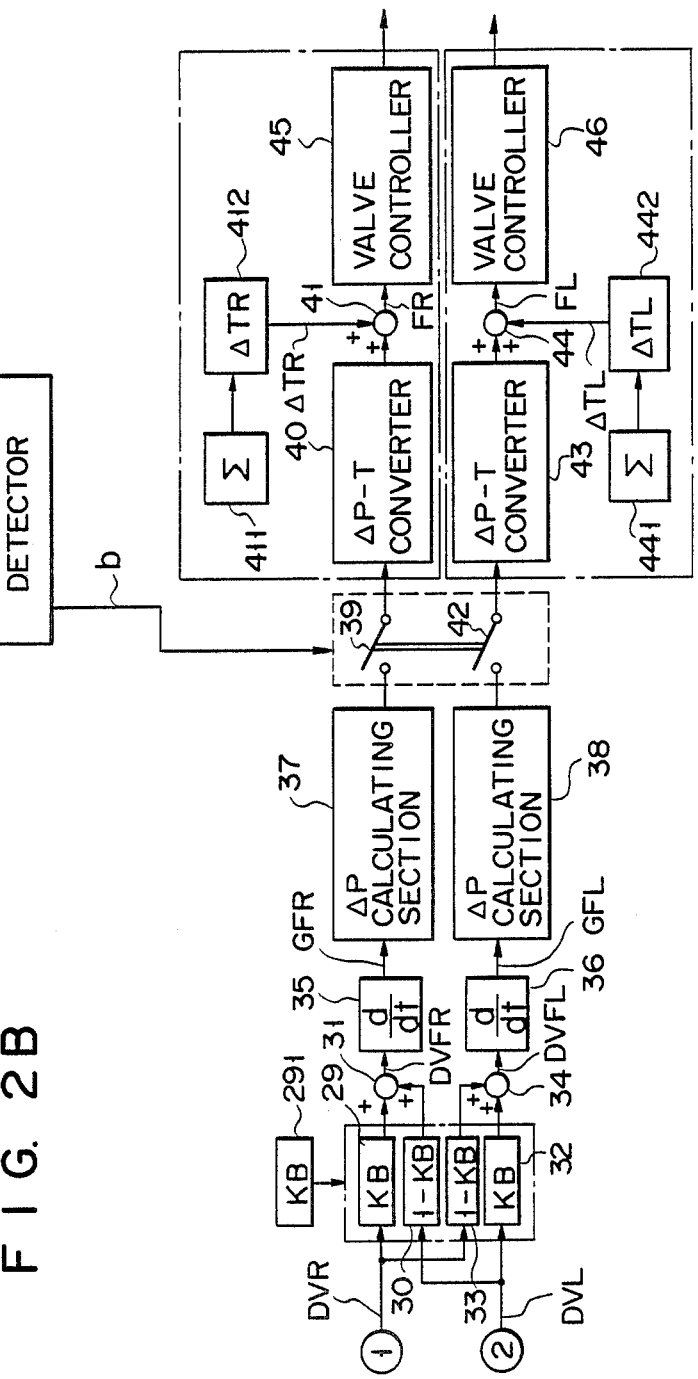
Figure 3:
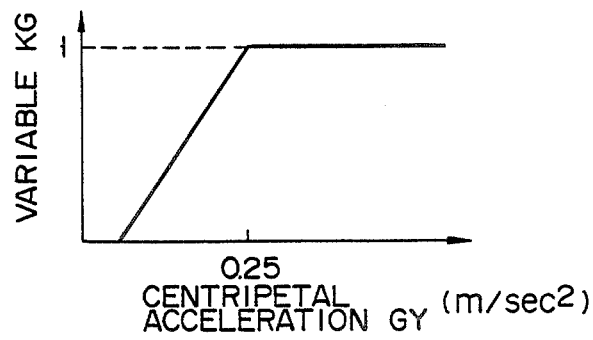
FIG. 3 is a graph showing the relationship between a centripetal acceleration GY and a variable KG.
Figure 4:
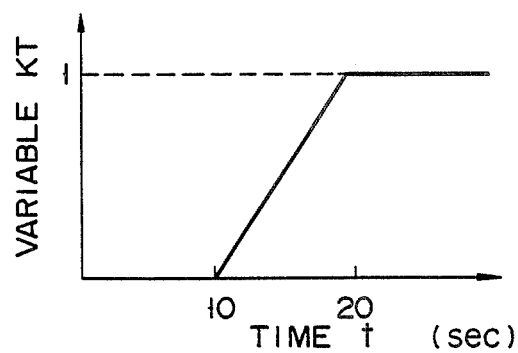
FIG. 4 is a graph showing the relationship between a time t after traction control is started and a variable KT.
Figure 5:
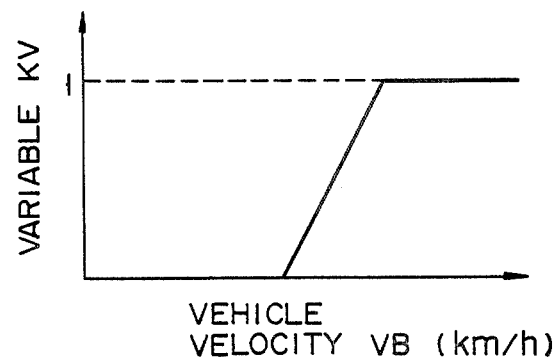
FIG. 5 is a graph showing the relationship between a vehicle velocity VB and a variable KV.
Figure 6:
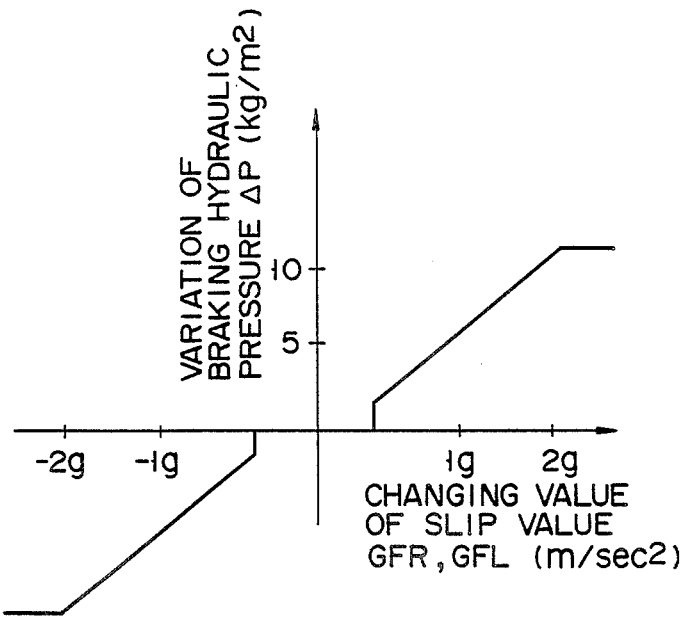
FIG. 6 is a graph showing the relationship between and a changing value GFR (GFL) of a slip value DV as a function of time and a braking hydraulic pressure variation ΔP.
Figure 7:
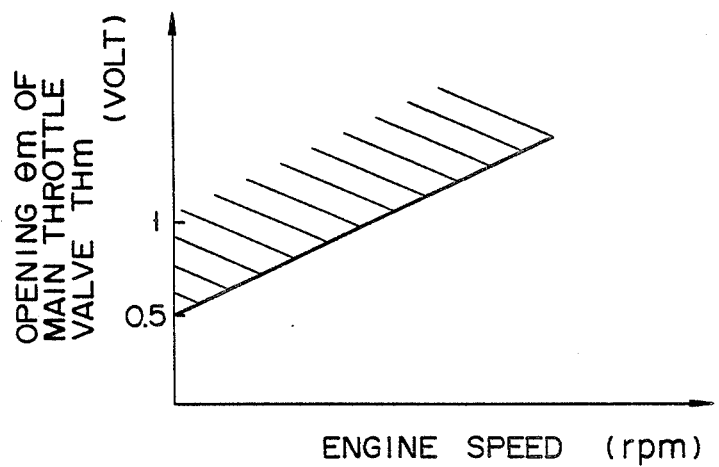
FIG. 7 is a graph showing the relationship between an engine speed NE and an opening of a main throttle valve THm.
Figure 10:
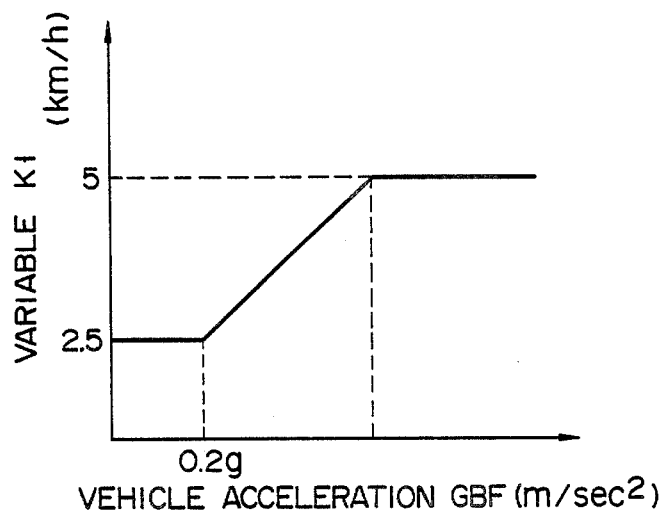
FIG. 10 is a graph showing the relationship between a vehicle acceleration GBF and a variable Kl.
Figure 11:
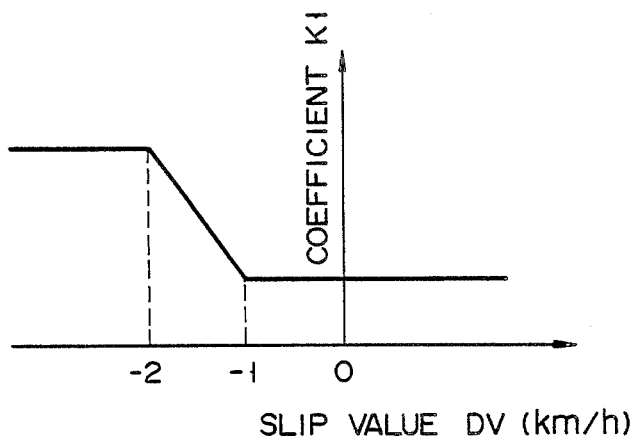
FIG. 11 is a graph showing the relationship between the slip value DV and a coefficient KI.
Figure 12:
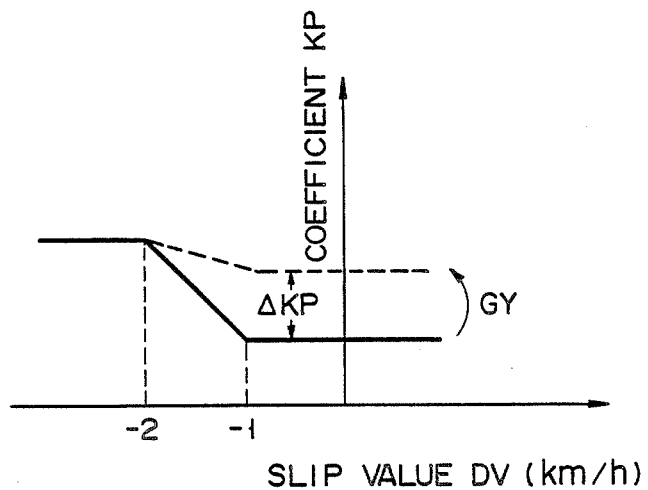
FIG. 12 is a graph showing the relationship between the slip value DV and a coefficient Kp.
Figure 13:
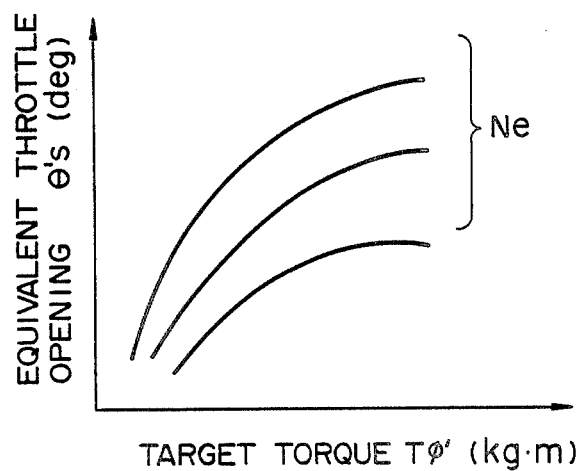
FIG. 13 is a graph showing the relationship between a target torque Tϕ' and an equivalent throttle opening θs'.
Figure 14:
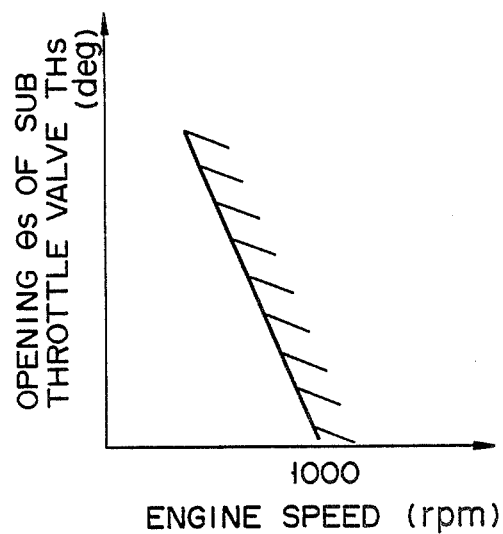
FIG. 14 is a graph showing the relationship between the engine speed Ne and a lower limit of an opening θs of a sub throttle valve THs.
Figure 15:
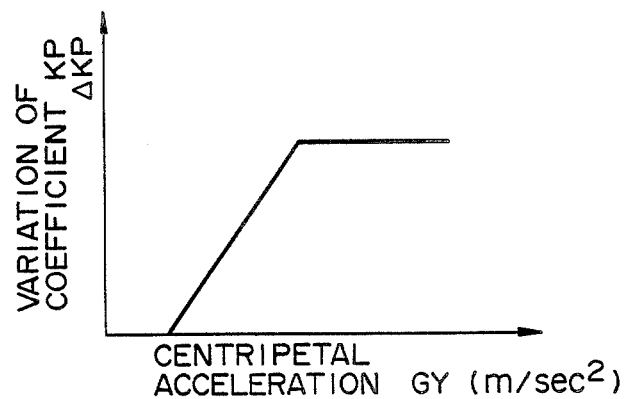
FIG. 15 is a graph showing the relationship between the centripetal acceleration GY and variation of coefficient Kp ΔKp.

More specifically, the memory 15m stores the traction control program whose control content is shown in FIGS. 2A and 2B in units of functional blocks, a variable KG shown in FIG. 3, a variable KT shown in FIG. 4, a variable KV shown in FIG. 5, a GFR (GFL) −ΔP map shown in FIG. 6, a map showing the opening θm of the main throttle valve THm shown in FIG. 7, a variable Kl shown in FIG. 10, a coefficient KI shown in FIG. 11, ΔKp shown in FIG. 12, a Tφ′−θs′ map shown in FIG. 13, a θs map shown in FIG. 14, a ΔKp map shown in FIG. 15, a vehicle weight W and a wheel radius Re, correction torques TSn and TPn, a target torque Tφ, a braking time FR of the right driving wheel, a braking time FL of the left driving wheel, a present vehicle acceleration $GB_n$, an immediately preceding vehicle acceleration $GB_{n-1}$, a present vehicle acceleration GBF passed through a filter, an immediately preceding vehicle acceleration $GBF_{n-1}$ passed through the filter, a timer t1 for counting a time t1 after traction control is started, a control flag CNT1 which is set when a start condition for starting engine output control is established and is reset when an end condition for ending the control is established, a control flag CNT2 which is set when a start condition for starting braking control is established and is reset when an end condition for ending the braking control is established, and a shift change flag CHFLG to which "1" is set for a predetermined period of time after a shift change operation is performed.

Figure 2C:
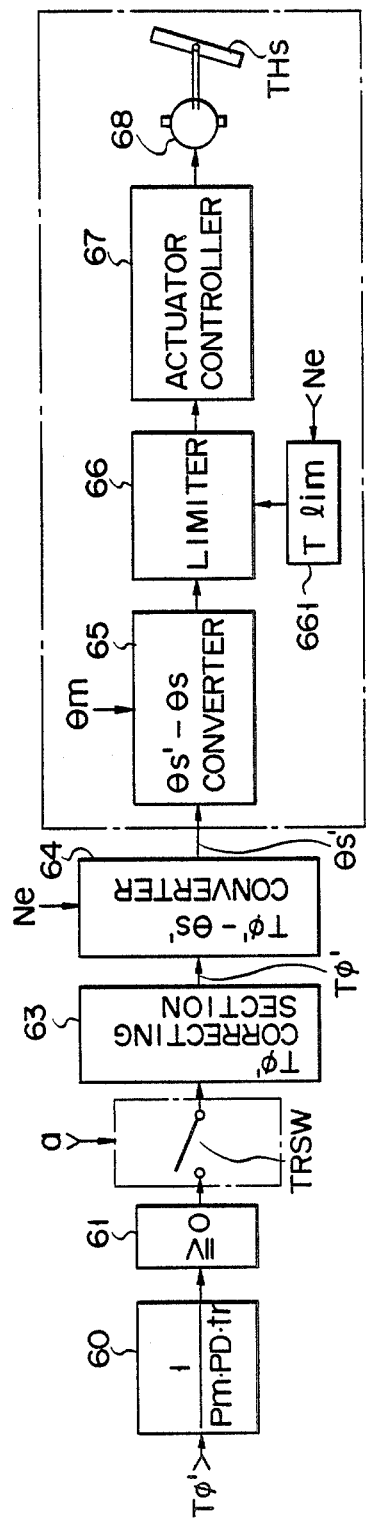

The detailed arrangement of the traction controller 15 will be described below with reference to the block diagrams of FIGS. 2A to 2C showing the control of the traction controller 15 in units of functional blocks. The wheel velocities VFR and VFL of the driving wheels detected by the wheel velocity sensors 11 and 12 are averaged by an averaging section 21 to calculate an average wheel velocity (VFR +VFL)/2. At the same time, the wheel velocities VFR, VFL, VIR, VRL are sent to a slip rate calculating section 111. In this section 111 slip rate $$S\left(=\frac{VFR \text{ (or } VFL) - VRR \text{ (or } VRL)}{VFR \text{ (or } VFL)}\right) \times 100$$

is calculated. And at the same time, the wheel velocities VRR and VRL are sent to a drive state detecting section 112. In this section 112, various drive conditions are detected. For example, a vehicle velocity VB and an acceleration of the vehicle and an centripental acceleration GY are calculated in section 112a, 112b, 112d on the basis of the wheel velocities VRR and VRL. And also a time t after traction control by braking is started is counted in timer T. At the same time, the wheel velocities VFR and VFL of the driving wheels detected by the wheel velocity sensors 11 and 12 are sent to a low vehicle velocity selecting section (SL) 22, so that a lower vehicle velocity Vdl of the wheel velocities VFR and VFL is selected and output. The average wheel velocity Vde output from the averaging section 21 is multiplied with a variable K by a weighting section 23. The selected wheel velocity output from the SL 22 is multiplied with (1−K) by a weighting section 24. The outputs from the weighting sections 23 and 24 are added to each other by an adder 25. As the variable K, a largest one of a variable KG which changes in accordance with a centripetal acceleration GY generated upon turning of a vehicle, the variable KT which changes along with the time t after slip control by braking is started, and the variable KV which changes in accordance with a vehicle velocity (driven wheel velocity) VB, as shown in FIGS. 3 to 5 is selected by a variable setting section 231. The wheel velocity output from the adder 25 is sent to a differential section 26 as a driving wheel velocity VF, so that a changing value of driving wheel velocity VF as a function of time, i.e., a driving wheel acceleration GW is calculated. At the same time, the velocity VF is used for calculating a slip value DV of the driving wheel, as will be described later.

The vehicle velocity VFR of the right driving wheel detected by the wheel velocity sensor 11 is sent to a subtractor 27, so that a reference driving wheel velocity Vφ (to be described later) is subtracted therefrom. The wheel velocity VFL of the left driving wheel detected by the wheel velocity sensor 12 is sent to a subtractor 28, so that the reference driving wheel velocity Vφ (to be described later) is subtracted therefrom. The output from the subtractor 27 is multiplied with KB set by the KB setting section 291 (0<KB<1) by a multiplier 29, and the output from the subtractor 28 is multiplied with (1−KB) by a multiplier 30. Thereafter, the outputs from the multipliers 29 and 30 are added to each other by an adder 31 to obtain a slip value DVFR of the right driving wheel WFR. Similarly, the output from the subtractor 28 is multiplied with KB by a multiplier 32, and the output from the subtractor 27 is multiplied with (1−KB) by a multiplier 33. Thereafter, the outputs from the multipliers 32 and 33 are added to each other by an adder 34 to obtain a slip value DVFL of the left driving wheel WFL. The slip value DVFR of the right driving wheel WFR is differentiated by a differential section 35 to calculate its change as a function of time, i.e., a slip changing value GFR. The slip value DVFL of the left driving wheel WFL is differentiated by a differential section 36 to calculate its changing value as a function of time, i.e., a slip changing value GFL. The slip changing value GFR is sent to a braking hydraulic pressure variation ΔP calculating section 37 to obtain a braking hydraulic pressure variation ΔP necessary for suppressing the slip changing value GFR with reference to the GFR (GFL)−ΔP conversion map shown in FIG. 6. Similarly, the slip changing value GFL is sent to a braking hydraulic pressure variation ΔP calculating section 38 to obtain a braking hydraulic pressure variation ΔP necessary for suppressing the slip changing value GFL with reference to the GFR (GFL) ΔP conversion map shown in FIG. 6 (if DV>6 km/h, a larger one of ΔP and 2 kg/cm² is employed). The variation ΔP represents a variation in amount of liquid flowing in or flowing out through the inlet valve 17i (18i) or the outlet valve 17o (18o). More specifically, as the slip changing value GFR (GFL) is increased, AP is increased, and the driving wheels WFR and WFL are braked to decrease a driving torque.

The braking hydraulic pressure variation ΔP, output from the ΔP calculating section 37 for suppressing the slip changing value GFR is supplied to a ΔP−T converter 40 for calculating open times T of the inlet valve 17i and the outlet valve 17o through a switch 39. When the variation ΔP is a positive value, the open time of the inlet valve 17i is calculated, and when the variation ΔP is a negative value, the open time of the outlet valve 17o is calculated. The switch 39 is opened/closed by signal b outputted from a slip detector 391 when a start/end condition for braking the driving wheel is satisfied. For example, the following three conditions (1) to (3) are satisfied at the same time, the switch 39 is closed: (1) an idle switch SW is OFF; (2) the main throttle opening θm falls within a hatched region of FIG. 7; and (3) the slip value DVFR (DVFL)>2 (km/h) and a G switch is ON, or the slip value DVFR (DVFL)>5 (km/h). The G switch is turned on/off in accordance with GFR (GFL). When GFR (GFL)>1g, the G switch is turned on, and when GFR (GFL)<0.5g, it is turned off (g indicates the gravitational acceleration). The switch 39 is opened by said signal b when one of the following three conditions is satisfied: (1) the idle SW is ON; (2) an accelerator SW is ON; and (3) an ABS (Anti-lock Brake System) is operated. The signal b is also outputted to said drive state detecting section 112 so that the time t after traction control by braking is counted in timer T. 411 is a right drive time accumulation section. This section 411 calculates an accumulation value ΣTir of drive times of the right inlet valve 17i set every predetermined period from the signal b is outputted until an immediately preceding period, and an accumulation value ΣTor of drive times of the right outlet valve 17o set every predetermined period. The accumulation values ΣTir and ΣTor are sent to a right drive time correcting section 412. The section 412 calculates an invalid liquid amount correction value ΔTR (=KT·ΣTor−ΣTir), KT is constant. Thereafter, the open time T of the inlet valve 17i calculated by the ΔP−T converter 40 is added to the invalid liquid amount correction value ΔTR in control by an adder 41, and the open time T of the outlet valve 17o is directly output to be used as the braking time FR of the right driving wheel WFR. Then, the driving time of the inlet valve 17i and the outlet valve 17o is controlled by a valve controller 45.

The braking hydraulic pressure variation ΔP, output from the ΔP calculating section 38 for suppressing the slip changing value GFL is supplied to a ΔP−T converter 43 for calculating open times T of the inlet valve 18i and the outlet valve 18o through a switch 42.

441 is a left drive time accumulation section. This section 441 calculates an accumulation value ΣTil of drive times of the left inlet valve 18i set every predetermined period from the signal b is outputted until an immediately preceding period, and an accumulation value ΣTol of drive times of the left outlet valve 18o set every predetermined period. The accumulation values ΣTil and ΣTol are sent to a left drive time correcting section 442. The section 442 calculates an invalid liquid amount correction value ATL ($=KT\cdot\Sigma Tol-\Sigma Til$), Kt is constant. Thereafter, the open time T of the inlet valve 18i calculated by the ΔP−T converter 43 is added to the invalid liquid amount correction value ATL in control by an adder 44, and the open time T of the outlet valve 18o is directly output to be used as the braking time FL of the left driving wheel WFR. Then, the driving time of the inlet valve 18i and the outlet valve 18o is controlled by a valve controller 46. The correction value corrects a delay time from when a brake liquid amount is increased until a brake begins to function. In this case, since ΔTR(L) can be a maximum of 40 ms to correct the delay time, it is clipped at 40 ms.

The wheel velocities VRR and VRL of the driven wheels detected by the wheel velocity sensors 13 and 14 are sent to a high vehicle velocity selecting section (SH) 45, and a higher one of the wheel velocities VRR and VRL is selected and output as the vehicle velocity VB.

At the same time, the wheel velocities VRR and VRL of the driven wheels detected by the wheel velocity sensors 13 and 14 are sent to a drive state detecting section 112. A centripetal acceleration GY calculating section 112d of the means 112 calculate an acceleration GY as the centripetal acceleration for judging the presence/absence and degree of turning of a vehicle. And the vehicle velocity VB and travel acceleration VB' are also calculated on the basis of the wheel velocities VRR and VRL.

The vehicle velocity VB selected and output by the SH 45 is input to a vehicle acceleration calculating section 47 at every 15-msec sampling time T to calculate an acceleration of the vehicle velocity VB, i.e., a vehicle acceleration VB' (GB). The vehicle acceleration VB' is calculated by dividing a difference between a vehicle velocity $VB_n$ presently input to the vehicle acceleration calculating section 47 and a vehicle velocity $VB_{n-1}$ previously input to the vehicle acceleration calculating section 47 by the sampling time T. That is, $$VB' = GB_n = (VB_n - VB_{n-1})/T \quad (1)$$

More specifically, the vehicle acceleration calculating section 47 calculates the vehicle acceleration VB' (GB), so that a driving torque capable of being transmitted from the driving wheel to a road surface is estimated from the vehicle acceleration VB' of the driven wheels generated during acceleration slippage of the driving wheels. More specifically, in the case of the front-wheel drive vehicle, a force F capable of being transmitted from the driving wheels to a road surface is given by:

$$F = \mu WF = MB \cdot VB'$$

(where WF is the driving wheel sharing load, and MB is the vehicle mass)

Figure 9:
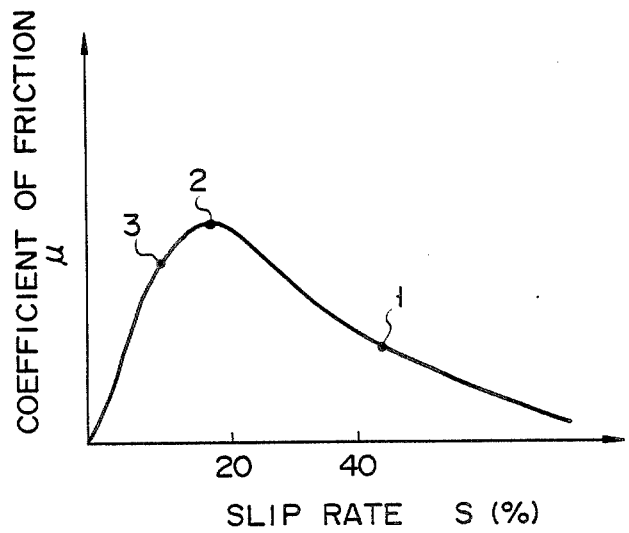
FIG. 9 is a graph showing the relationship between a slip rate S and a friction coefficient μ of a road surface.

As can be seen from equation (2), when the driving wheel sharing load WF and the vehicle mass are constant values, a friction coefficient μ of a road surface is in proportion to the vehicle acceleration VB'. When the driving wheels slip and a slip rate S exceeds a point "2", it exceeds a maximum value of μ, and μ approaches a point "1", as shown in FIG. 9. When the slip rate converges, μ falls within a region between "2" and "3" through the peak "2". If the vehicle acceleration VB' at the peak "2" can be measured, a maximum torque capable of being transmitted to a road surface having the corresponding friction coefficient μ can be estimated. The maximum torque is used as a reference torque TG.

The vehicle acceleration VB (GB) calculated by the vehicle acceleration calculating section 47 is passed through a filter 48 to obtain a vehicle acceleration GBF. More specifically, when a vehicle is in a state corresponding to the position "1" in FIG. 9, it quickly shifts to a state corresponding to the position "2". Therefore, the previously calculated $GBF_{n-1}$ and the presently detected $GB_n$ are similarly weighted and averaged to calculate $GBF_n = (GBF_{n-1} + GB_n)/2$. Between the positions "2" and "3" in FIG. 9, in order to prolong a response time and to improve acceleration characteristics such that a larger maximum torque is estimated on the basis of an acceleration closer to an acceleration corresponding to the position "2" as much as possible, the previously calculated $GBF_{n-1}$ is weighted by a larger value to calculate $GBF_n = (27 GBF_{n-1} + 5 GB_n)/32$. The vehicle acceleration GBF is supplied to a reference torque calculating section 49 to calculate the reference torque $TG = GBF \times W \times Re$ (where W is the vehicle weight and Re is the wheel radius). The reference torque TG calculated by the reference torque calculating section 49 is supplied to a torque lower limit limiter 50, so that a lower limit Ta of the reference torque TG is limited to, e.g., 45 kg·m.

The vehicle velocity VB selected by the SH 45 is multiplied with K0 (e.g., 1.03) by a constant multiplier 51, and the product is added to the variable Kl stored in a variable memory 53 by an adder 52 to obtain the reference driving wheel velocity Vφ. Note that Kl changes in accordance with the vehicle acceleration GBF (VB'), as shown in FIG. 10. When the vehicle acceleration GBF (VB') is large, as shown in FIG. 10, it is determined that a vehicle travels along a rough road such as a gravel road. On the gravel road, since the peak of the friction coefficient μ is present in a portion with a large slip rate in FIG. 9, Kl is increased to increase the reference driving wheel velocity Vφ as a criterion for slip determination, that is, to moderate the criterion for slip determination to increase the slip rate, thereby improving acceleration characteristics. The reference driving wheel velocity Vφ as an output from the adder 52 is subtracted from the driving wheel velocity VF calculated by the adder 25 by a subtractor 54 to calculate the slip value $DV = VF - V\phi$.

The slip value DV is supplied to a TSn calculating section 55 at every sampling time T in a state wherein the shift change flag CHFLG is not "1", i.e., during a period other than a period within a predetermined period of time from a shift change operation, and is integrated while being multiplied with the coefficient KI set by a KI setting section 552, thereby calculating a correction torque TSn. That is, a correction torque obtained by integrating the slip value DV, i.e., an integral correction torque TSn is calculated as follows:

$$TSn = KI \cdot \Sigma DVi$$

The coefficient KI changes in accordance with the slip value DV, as shown in FIG. 11. A shift position detecting section 551 receives the shift signal SHT shown in FIG. 1A, and when the shift change operation is performed, i.e., for a predetermined period of time from when the shift signal SHT changes, the shift change flag CHFLG is set to be "1".

The slip value DV is supplied to a TPn calculating section 56 at every sampling time T, thereby calculating a correction torque TPn proportional to the slip value DV. More specifically, a correction torque proportional to the slip value DV, i.e., a proportional correction torque TPn, given by TPn=DV×Kp (Kp is the coefficient set by a Kp setting section 561) is calculated. The coefficient Kp changes in accordance with the slip value DV, as shown in FIG. 12. The coefficient Kp changes by ΔKp in accordance with the centripetal acceleration GY, as shown in FIG. 14.

The integral correction torque TSn calculated by the TSn calculating section 55 is subtracted from the reference torque Tφ by a subtractor 57. The subtraction result (TG−TSn) is input to a torque lower limit limiter 58 so that the lower limit of a torque is limited to Tb, e.g., 45 kg.m. Furthermore, TG−TSn−TPn is calculated by a subtractor 59, thus obtaining a target torque Tφ. Based on the&target torque Tφ, Tφ×1/(ρm·ρD·tr) is calculated by an engine torque calculating section 60, thereby calculating a target torque Tφ' as an engine torque. In this case, ρm is the transmission gear ratio, ρD is the deceleration ratio, and tr is the torque ratio. The target torque Tφ' as the engine torque calculated by the engine torque calculating section 60 is supplied to a lower limit torque limiter 61, so that the lower limit of the target torque Tφ' is limited to 0 kg.m. After the lower limit torque of the target torque Tφ' is limited by the lower limit torque limiter 61, the target torque Tφ' is input to a correction section 63 through a traction control switch TRSW.

The switch TRSW is closed by a signal a outputted from the slip detector 391 when the control flag CNT1 is set to be "1" and is opened when it is "0". Processing for controlling a throttle opening so that the output torque of the engine reaches the target torque is started or ended. When the switch TRSW is closed, the following three conditions (1) to (3) are satisfied at the same time: (1) the idle switch is OFF; (2) the main throttle opening θm falls within a hatched region of FIG. 7; (3) DVFR(FL)>2 (km/h) and GW>0.2g and ΔDV>0.2g (g indicates the gravitational acceleration). When one of the following four conditions is satisfied, the switch TRSW is opened: (1) the main throttle opening θm <0.533θs continues for 0.5 sec; (2) the ON state of the accelerator SW continues for 0.5 sec; (3) the ON state of the idle SW continues for 0.5 sec; and (4) the ABS is operated. In the correction section 63, the target torque Tφ' is corrected in accordance with an engine cooling water temperature, an air pressure, and an intake air temperature.

The target torque Tφ' is supplied to a Tφ'−θs' converter 64 to calculate an equivalent throttle opening θs' for obtaining the target torque Tφ' when the main throttle valve THm and the sub throttle valve THs ar considered as a single unit. Note that the Tφ'−θs' relationship is shown in FIG. 13. The equivalent throttle opening θs' calculated by the Tφ'−θs' converter 64 is supplied to a θs'−θs converter 65 to obtain a sub throttle opening θs when the equivalent throttle opening θs' and the main throttle opening θm are input. The sub throttle opening θs is output to a limiter 66. When the sub throttle opening θs is too small when the engine speed Ne is low, an engine stalls. Therefore, the limiter 66 provides a lower limit of the sub throttle opening θs set by a lower limit setting section 661. FIG. 14 shows the relationship between the lower limit and the engine speed Ne. As shown in FIG. 14, the lower limit is increased as the engine speed Ne is decreased. The sub throttle valve THs is controlled by an actuator controller 67 to obtain the sub throttle opening θs, so that the engine output has the target torque.

The operation of the traction control apparatus for a vehicle according to the first embodiment of the present invention with the above arrangement will now be described. The wheel velocities VFR and VFL of the driving wheels output from the wheel velocity sensors 11 and 12 are averaged by the averaging section 21 to calculate the average wheel velocity (VFR+VFL)/2. At the same time, the wheel velocities VFR and VFL of the driving wheels are supplied to the SL 22, so that a lower one of the wheel velocities VFR and VFL is selected and output. The wheel velocity output from the averaging section 21 is multiplied with the variable K by the weighting section 23, and the wheel velocity output from the SL 22 is multiplied with (1−K) by the weighting section 24. Thereafter, the outputs from the weighting sections 23 and 24 are added to each other by the adder 25. As the variable K, a largest one of the variables KG, KT, and KV shown in FIGS. 3 to 5 is selected. This is to match with various conditions of turning of a vehicle, a time after braking control is started, and the vehicle velocity VB. More specifically, when only the wheel velocity output from the SL 22 is used, engine output decreasing control is performed in accordance with the lower wheel velocity. Therefore, for a wheel having a higher wheel velocity, i.e., a wheel suffering from a larger slip value, mainly braking control is performed, and a decrease value of the engine output is made small to improve acceleration characteristics. When only the wheel velocity output from the averaging section 21, the engine output is controlled in accordance with a higher wheel velocity, i.e., a wheel velocity suffering from a larger slip value, the engine output is largely decreased, and acceleration characteristics of the vehicle are impaired. For this reason, the weighting sections 23 and 24 are arranged, so that the wheel velocities output from the SL 22 and the averaging section 21 are weighed while changing the variable K, thereby preventing slippage of the driving wheels in correspondence with the drive state of a vehicle. More specifically, when a turning tendency of a vehicle becomes large (when the centripetal acceleration GY is increased), the variable KG is set to be "1" to use the average wheel velocity of the averaging section 21, thereby preventing that a difference between rotational speeds of the left and right driving wheels caused by an inner wheel difference upon turning is erroneously determined as slippage. When a braking time is prolonged, the variable KT is set to be "1", and the lower driving wheel velocity is used to have KT=0 for a while after traction control is started. Thus, a decrease in driving torque of a driving wheel having a larger slip value is mainly achieved by braking control, and the engine is controlled to have acceleration characteristics as the primary importance. After the time has passed and KT=1 is established, traction control by reducing the engine output is also performed, thereby preventing an increase in energy loss due to use of braking control for a long period of time. The variable KV is set to be KV=0 since a variation in both the driving wheels' velocity is largest upon starting of a vehicle (VB=0) and the braking control is effective. However, in a high-speed travel state, KV=1 so as to use only the average wheel velocity of the averaging section 21, thereby avoiding immediate braking using a brake when slippage occurs in the high-speed travel state. The wheel velocity output from the adder 25 is supplied to the differential section 26 as the driving wheel velocity VF, thereby calculating a changing value in driving wheel velocity VF as a function of time, i.e., the driving wheel acceleration GW. In addition, the wheel velocity is used for calculating the slip value DV of the driving wheels, as will be described later.

The wheel velocity VFR of the right driving wheel detected by the wheel velocity sensor 11 is supplied to the subtractor 27, so that the reference driving wheel velocity V$\phi$ (to be described later) is subtracted therefrom. The wheel velocity VFL of the left driving wheel detected by the wheel velocity sensor 12 is supplied to the subtractor 28, so that the reference driving wheel velocity V$\phi$ is subtracted therefrom. The output DVR from the subtractor 27 is multiplied with KB (0<KB<1) by the multiplier 29, and the output DVL from the subtractor 28 is multiplied with (1−KB) by the multiplier 30. Thereafter, the outputs from the multipliers 29 and 30 are added to each other by the adder 31 so as to obtain the slip value DVFR of the right driving wheel. Similarly, the output from the subtractor 28 is multiplied with KB by the multiplier 32, and the output from the subtractor 27 is multiplied with (1−KB) by the multiplier 33. Thereafter, the outputs from the multipliers 32 and 33 are added to each other by the adder 34 so as to obtain the slip value DVFL of the left driving wheel. For example, when a =0.8, if one driving wheel slips, the other driving wheel is braked by a 20% force. If the brakes of the left and right driving wheels are independent of each other, when one driving wheel is braked and its rotational speed is decreased, the opposite driving wheel slips in turn upon operation of a differential gear, and is then braked. This operation is undesirably alternately repeated. The slip value DVFR of the right driving wheel is differentiated by the differential section 35 to calculate its changing value as a function of time, i.e., the slip changing value GFR. The slip value DVFL of the left driving wheel is differentiated by the differential section 36 to calculate its changing value as a function of time, i.e., the slip changing value GFL. The slip changing value GFR is supplied to the braking hydraulic pressure variation $\Delta P$ calculating section 37 to obtain the braking hydraulic pressure variation AP for suppressing the slip changing value GFR with reference to the GFR (GFL)−$\Delta P$ conversion map shown in FIG. 6. Similarly, the slip changing value GFL is supplied to the braking hydraulic pressure variation $\Delta P$ calculating section 38 to obtain the braking hydraulic pressure variation $\Delta P$ for suppressing the slip changing value GFL with reference to the GFR (GFL)−$\Delta P$ conversion map shown in FIG. 6.

The braking hydraulic pressure variation $\Delta P$, output from the $\Delta P$ calculating section 37 for suppressing the slip changing value GFR is supplied to the $\Delta P-T$ converter 40 for calculating the open times T of the inlet valve 17$i$ and the outlet valve 17$o$ through the switch 39. The open time T of the inlet valve 17$i$ calculated by the $\Delta P-T$ converter 40 is added to the invalid liquid amount correction value $\Delta TR$ under control by the adder 41, and the open time T of the outlet valve 17$o$ is directly output to be used as the braking time FR of the right driving wheel. Similarly, the braking hydraulic pressure variation $\Delta P$, output from the $\Delta P$ calculating section 38, for suppressing the slip changing value GFL is supplied to the $\Delta P-T$ converter 43 for calculating the open times T of the inlet valve 18$i$ and the outlet valve 18$o$. The open time T of the inlet valve 18$i$ is added to the invalid liquid amount correction value ATL under control by the adder 44, and the open time T of the outlet valve 18$o$ is directly output to be used as the braking time FL of the left driving wheel Then, valves 17$i$, 17$o$, 18$i$, 18$o$, 202R, 202L are controlled by the valve controllers 45, 46. As described above the open time T is corrected by being added to, the invalid liquid correction values $\Delta TR$ and $\Delta TL$, thereby correcting a short in liquid amount from when the valves are ON until the brakes begin to function. In this manner, as has been described in the description of the arrangement, when the slip values of the driving wheels are increased and the conditions of closing the switches 39 and 42 are satisfied, the driving wheels are braked.

The wheel velocities VRR and VRL of the driven wheels detected by the wheel velocity sensors 13 and 14 are sent to the SH 45, and a higher one of the wheel velocities VRR and VRL is selected and output as the vehicle velocity VB. The SH 45 selects a higher one of inner and outer wheel velocities in consideration of an inner wheel difference when a vehicle travels along a curved road, thereby preventing erroneous determination of slippage. More specifically, as will be described later, the vehicle velocity VB serves as a reference velocity for detecting generation of slippage. The vehicle velocity VB is increased to prevent erroneous slippage determination caused by the inner wheel difference when a vehicle travels along a curved road.

At the same time, the wheel velocities VRR and VRL of the driven wheels detected by the wheel velocity sensors 13 and 14 are sent to the centripetal acceleration GY calculating section 112$d$ of the drive state detecting means 112 so as to calculate GY as the centripetal acceleration G for judging the presence/absence and degree of turning of a vehicle.

The vehicle velocity VB selected and output by the SH 45 is input the vehicle acceleration calculating section 47 to calculate an acceleration of the vehicle velocity VB, i.e., the vehicle acceleration VB' (GB).

The vehicle acceleration VB' (GB) calculated by the vehicle acceleration calculating section 47 is filtered through the filter 48 to obtain the vehicle acceleration GBF. More specifically, when a vehicle is in a state corresponding to the position "1" in FIG. 9 and the acceleration is increasing, control is quickly shifted to a state corresponding to a state of the position "2" is quickly started. Therefore, the previously calculated $GBF_{n-1}$ and the presently detected $GB_n$ are similarly weighted and averaged to calculate $GBF_n = (GBF_{n-1} + GB_n)/2$. Between the positions "2" and "3", in order to delay a response time and to improve acceleration characteristics such that a larger maximum torque is estimated on the basis of an acceleration closer to an acceleration corresponding to the position "2" as much as possible, the previously calculated $GBF_{n-1}$ is weighted by a larger value to calculate $GBF_n = (27 GBF_{n-1} + 5GB_n)/32$, thereby increasing a rate of holding the previous vehicle acceleration $GBF_{n-1}$.

The vehicle acceleration GBF is supplied to the reference torque calculating section 49 to calculate the reference torque $TG = GBF \times W \times Re$ (where W is the vehicle weight and Re is the wheel radius). The reference torque TG calculated by the reference torque calculating section 49 is supplied to the torque lower limit limiter 50, so that the lower limit Ta of the reference torque TG is limited to, e.g., 45 kg.m.

The vehicle velocity VB selected by the SH 45 is multiplied with K0 (e.g., 1.03) by the constant K1 stored in the variable memory 53 by the adder 52 to obtain the reference driving wheel velocity $V\phi$. Note that K1 changes in accordance with the vehicle acceleration GBF (VB'), as shown in FIG. 10. When the vehicle acceleration VB' is large, as shown in FIG. 10, it is determined that a vehicle travels along a rough road such as a gravel road. In this case, K1 is increased to increase the reference driving wheel velocity $V\phi$ as the criterion for slip determination, that is, to moderate the criterion for slip determination to increase the slip rate, thereby improving acceleration characteristics. The reference driving wheel velocity $V\phi$ as an output from the adder 52 is subtracted from the driving wheel velocity VF calculated by the adder 25 by the subtractor 54 to obtain the slip value $DV = VF - V\phi$.

The slip value DV is supplied to the TSn calculating section 55 every sampling time T in a state wherein the shift change flag CHFLG is "0", and is integrated while being multiplied with the coefficient KI, thereby calculating the correction torque TSn. That is, slip values DVi at the corresponding sampling times when the shift change flag CHFLG is "0" are integrated to obtain a correction torque, i.e., the integral correction torque TSn:

$$TSn = KI \cdot \Sigma DVi$$

The coefficient KI changes in accordance with the slip value DV, as shown in FIG. 11. In this manner, only when the shift change flag CHFLG is "0", the TSn calculating section 32 calculates the slip value DV. Therefore, the calculation of the slip value DV performed by the TSn calculating section 32 is held for a predetermined period of time after a shift change operation is performed. For this reason, slippage of the driving wheels caused by a shift change shock is prevented from being erroneously detected as acceleration slippage.

The slip value DV is supplied to the TPn calculating section 56 every sampling time T, thereby calculating the correction torque Tpn proportional to the slip value DV. More specifically, the correction torque proportional to the slip value DV, i.e., the proportional correction torque TPn, given by $TPn = DV \times Kp$ (Kp is the coefficient set by the Kp setting section 56) is calculated. The coefficient Kp changes in accordance with the slip value DV, as shown in FIG. 12.

Figure 8:
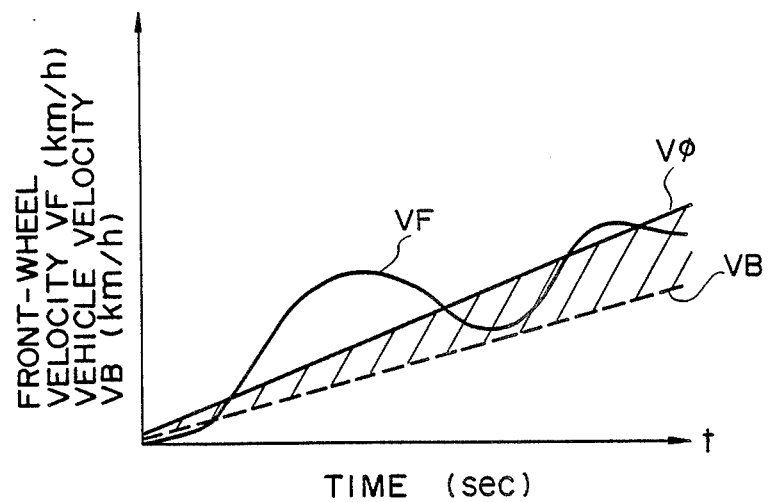
FIG. 8 is a graph showing changes in driving (front) wheel velocity VF, reference driving wheel velocity Vϕ, and vehicle velocity VB as a function of time.

More specifically, as shown in FIGS. 11 and 12, when $DV > -1$, the coefficients KI and Kp are smaller than those when $DV < -1$. A region larger than $V\phi$ in FIG. 8 almost corresponds to $DV > -1$. In this region, since a variation range is wide, if the coefficients KI and Kp are large, a gain is increased although a change in slip value DV is large and control becomes unstable. When $DV < -1$ (that is, an almost hatched region in FIG. 8), the coefficients KI and Kp are increased to increase the gain. When $DV < -1$, a variation range is present only between $V\phi$ and VB and is narrow, as shown in FIG. 8, the coefficients KI and Kp are increased to increase the gain, thereby shortening a response time. When the centripetal acceleration GY is increased, i.e., a turning tendency becomes large, as shown in FIG. 15, AKp (FIG. 12) is increased to increase the value Kp when $DV > -1$. Thus, the gain is increased not to cause unstable control, thereby suppressing generation of slippage along a curved road and improving turning performance.

The integral correction torque TSn calculated by the TSn calculating section 55 is subtracted from the reference torque $T\phi$ by the subtractor 57. The subtraction result $(TG - TSn)$ is input to the torque lower limit limiter 58 so that the lower limit of a torque is limited to Tb, e.g., 45 kg.m. Furthermore, $TG - TSn - TPn$ is calculated by the subtractor 59, thus obtaining the target torque $T\phi$. Based on the target torque $T\phi$, $T\phi \times 1/(\rho M \cdot \rho D \cdot tr)$ is calculated by the engine torque calculating section 60, thereby calculating the target torque $T\phi'$ as an engine torque. In this case, $\rho M$ is the transmission gear ratio, $\theta D$ is the deceleration ratio, and tr is the torque ratio. A torque exceeding 0 kg.m is output to the correction section 63 as the target torque $T\phi'$ through the switch TRSW. In the correction section 63, the target torque $T\phi'$ is corrected in accordance with an engine cooling water temperature, an air pressure, and an intake air temperature.

The target torque $T\phi'$ is supplied to the $T\phi' - \theta s'$ converter 64 to calculate the equivalent throttle opening $\theta s'$ for obtaining the target torque $T\phi'$ when the main throttle valve THm and the sub throttle valve THs are considered as a single unit. Note that the $T\phi' - \theta s'$ relationship is shown in FIG. 13. The equivalent throttle opening $\theta s$, calculated by the $T\phi' - \theta s'$ converter 64 is supplied to the $\theta s' - \theta s$ converter 65 to obtain the sub throttle opening $\theta s$ when the equivalent throttle opening $\theta s'$ and the main throttle opening $\theta m$ are input. The sub throttle opening $\theta s$ is output to the limiter 66. When the sub throttle opening $\theta s$ is too small when the engine speed Ne is low, an engine tends to stall. The lower limit of the sub throttle opening $\theta s$ is set so as to be increased as the engine speed Ne is lower. The sub throttle valve is controlled to obtain the sub throttle opening $\theta s$, so that the engine output torque has a maximum torque capable of being transmitted in a present road surface state.

When only one throttle valve is used unlike in the first embodiment wherein two throttle valves are used, the equivalent throttle opening $\theta s'$ is directly used as the opening of the throttle valve.

In the first embodiment, the vehicle velocity VB is multiplied with K0 by the constant multiplier 51, and the product is added to the variable K1 stored in the variable memory 53 by the adder 52 to obtain the reference driving wheel velocity $V\phi$. However, the present invention is not limited to this. For example, after the vehicle velocity VB is multiplied with a variable, the product can be added to a constant to calculate the reference driving wheel velocity $V\phi$. Alternatively, the vehicle velocity VB may be multiplied with a variable to obtain the reference driving wheel velocity $V\phi$.

A second embodiment of the present invention will now be described with reference to FIGS. 17A to 36. The same reference numerals in FIG. 17A denote the same parts as in FIG. 1A, and a detailed description thereof will be omitted. In the second embodiment, as shown in FIG. 16, a main throttle valve THm whose opening $\theta m$ is controlled in accordance with an operation amount of an accelerator pedal and a sub throttle valve THs whose opening is controlled by a traction controller 15 are arranged in series with each other.

The traction controller 15 receives a shift signal SHT from a transmission controller 151 for controlling switching of shift positions of an automatic transmission 16m. The SHT signal indicates a shift position of the automatic transmission 16m. The traction controller 15 also receives an engine speed signal Ne of the engine and the opening signal $\theta m$ of the main throttle valve THm shown in FIG. 16.

The detailed arrangement of the traction controller 15 shown in FIG. 17A will now be described with reference to FIG. 17B. The traction controller 15 comprises an MPU (micro processor unit) 15p including various registers, an ALU (arithmetic and logic unit), and the like, a memory 15m storing a traction control program, various maps, coefficient data, variable data, counters, and flags, and the like.

Figure 18C:
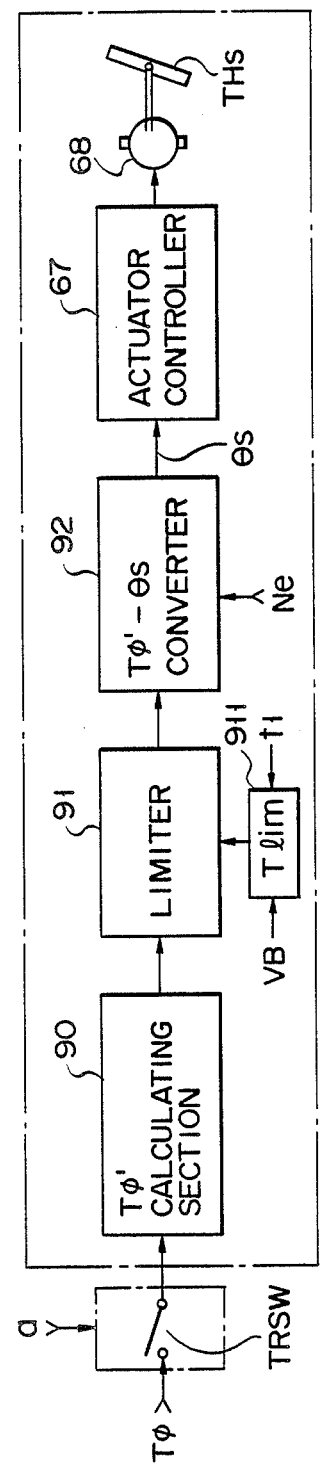
FIGS. 18A to 18C are block diagrams showing control of the traction controller shown in FIG. 17A in units of functional blocks.
Figure 30:
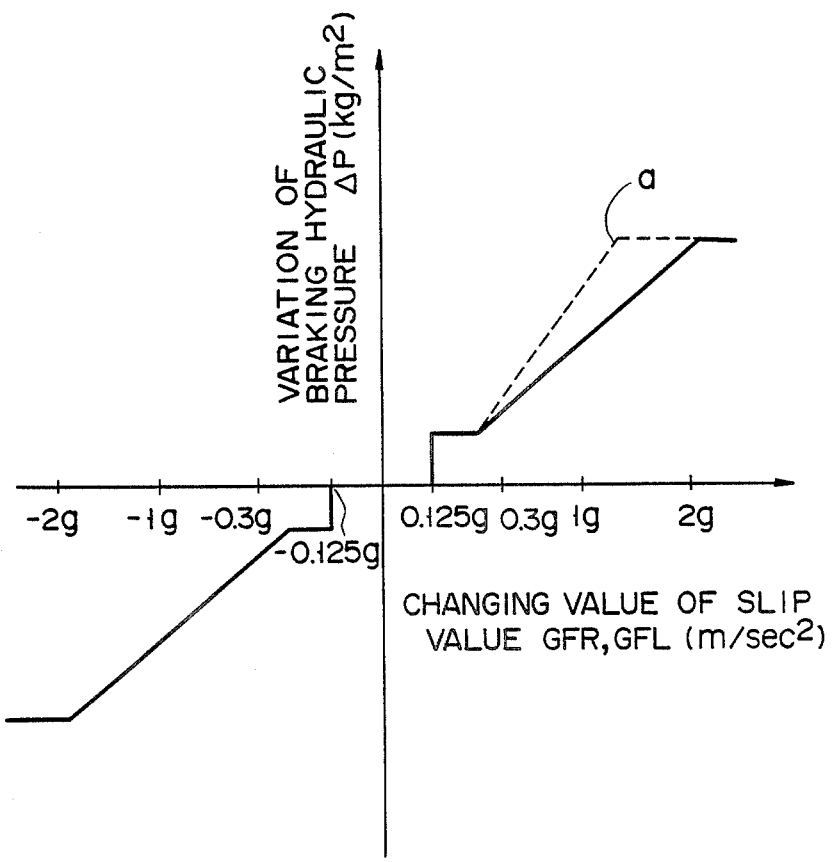
FIG. 30 is a graph showing the relationship between an changing value GFR (GFL) of a slip value DV as a function of time and a braking hydraulic pressure variation ΔP.
Figure 18A:
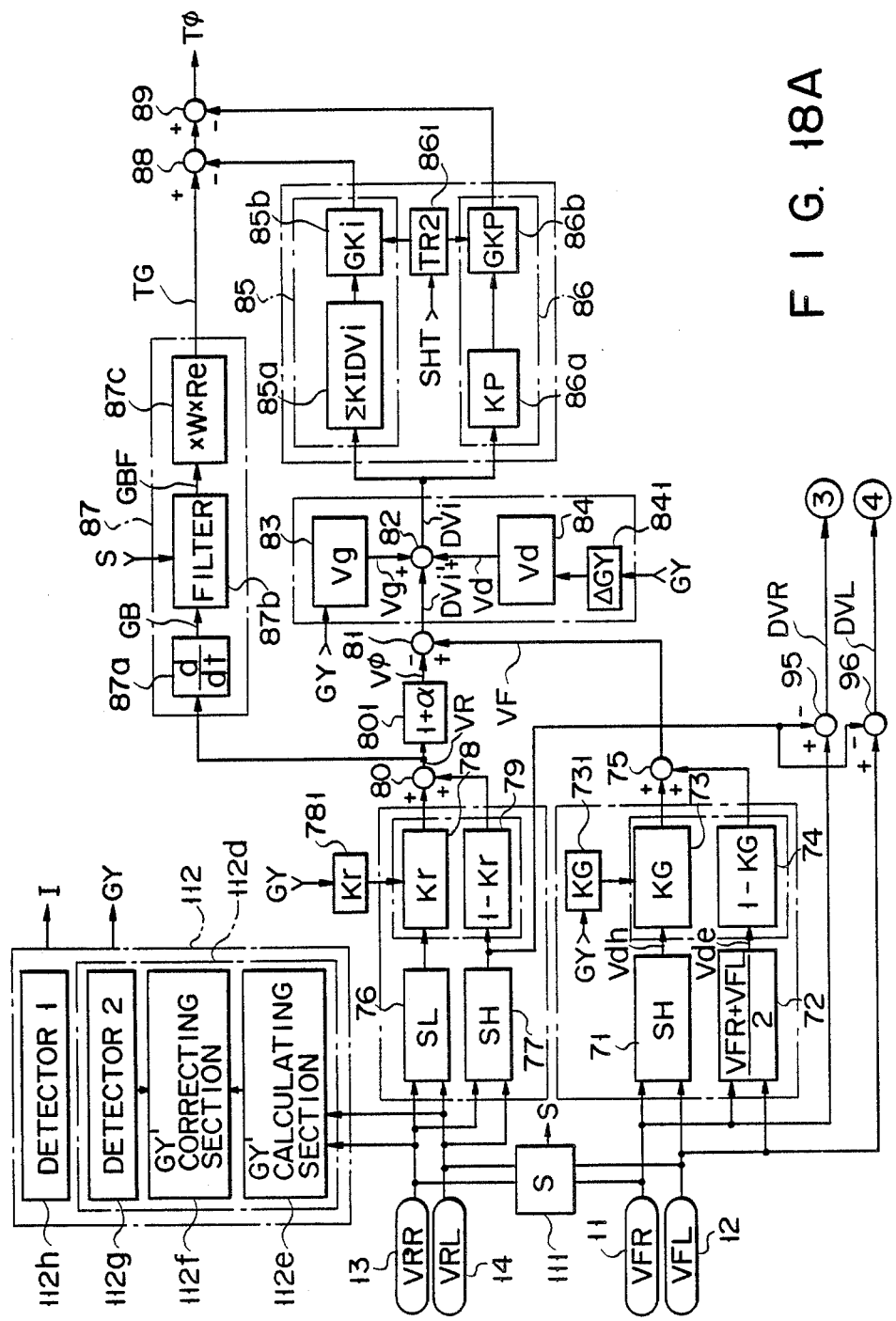
Figure 18B:
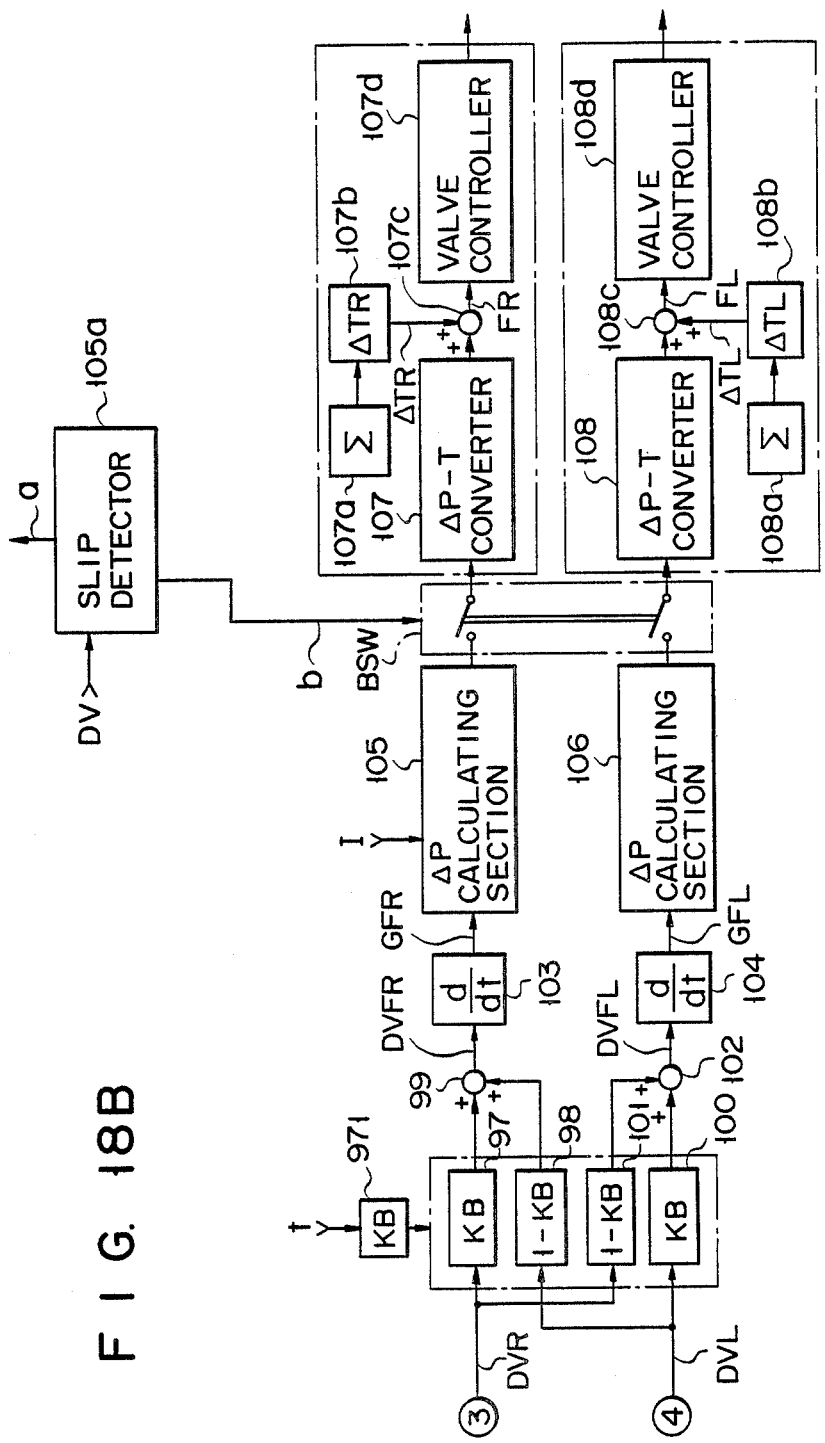
Figure 21:
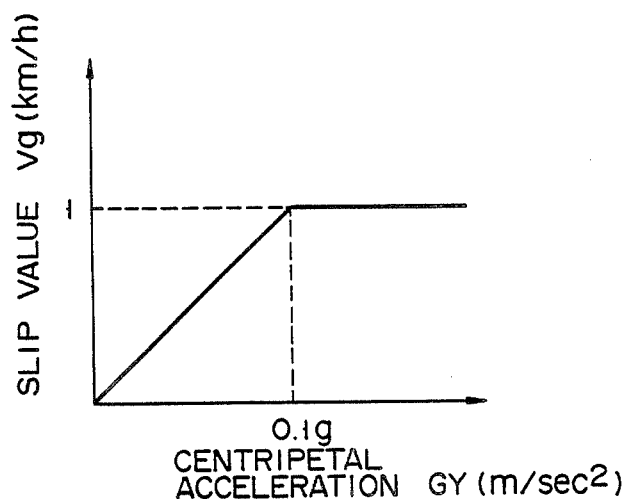
FIG. 21 is a graph showing the relationship between the centripetal acceleration GY and a slip value Vg.
Figure 22:
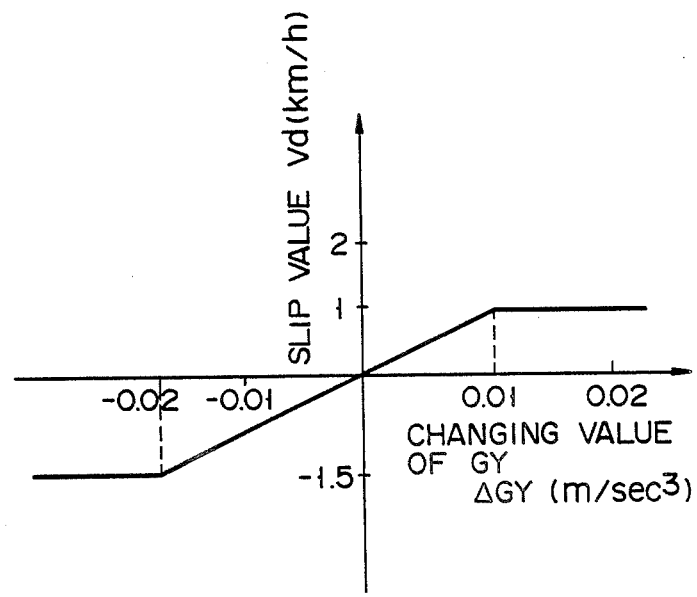
FIG. 22 is a graph showing the relationship between a changing value ΔGY of the centripetal acceleration GY as a function of time and the slip value Vd.
Figure 23:
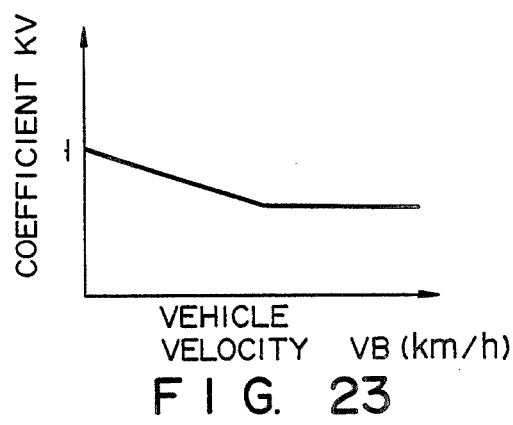
FIGS. 23 to 28 are graphs showing the relationship between a vehicle velocity VB and a coefficient KV.

More specifically, the memory 15m stores the traction control program whose control content is shown in FIGS. 18A to 18C in units of functional blocks, a variable KG shown in FIG. 19, a variable Kr shown in FIG. 20, a slip value Vg shown in FIG. 21, a slip value Vd shown in FIG. 22, a coefficient KV shown in FIGS. 23 to 28, a coefficient KB shown in FIG. 29, a GFR (GPL)$-\Delta P$ map shown in FIG. 30, a target torque lower limit Tlim shown in FIGS. 32 and 33, a vehicle weight W and a radius of tire Re, correction torques TSn and TPn, a target torque T$\phi$, a braking time FR of the right driving wheel, a braking time FL of the left driving wheel, a present vehicle acceleration GB$_n$, an immediately preceding vehicle acceleration GB$_{n-1}$, a present vehicle acceleration GBF$_n$ passed through a filter, an immediately preceding vehicle acceleration GBF$_{n-1}$ passed through the filter, coefficients GKI and GKp whose values are changed in accordance with gear shift positions, a timer t1 for counting a time t after traction control is started, a timer t2 for counting a setting time t2 after a shift change operation is started, a control flag CNT1 which is set when a start condition for starting engine output control is established and is reset when an end condition for ending the control is established, and the like.

The detailed arrangement of the traction controller 15 will be described below with reference to the block diagrams of FIGS. 18A to 18C showing the control of the traction controller 15 in units of functional blocks. Wheel velocities VFR and VFL of the driving wheels detected by wheel velocity sensors 11 and 12 are sent to a high vehicle velocity selecting section (SH) 71, so that a higher one of the wheel velocities VFR and VFL is selected and output. The wheel velocities VFR and VFL of the driving wheels detected by the wheel velocity sensors 11 and 12 are averaged by an averaging section 72 to calculate an average wheel velocity (VFR +VFL)/2. The selected wheel velocity output from the SH 71 is multiplied with the variable KG by a weighting section 73. The average wheel velocity output from the averaging section 72 is multiplied with (1−KG) by a weighting section 74. The outputs from the weighting sections 73 and 74 are added to each other by an adder 75. Note that the variable KG is set by KG setting section 731 and changes in accordance with a centripetal acceleration GY as shown in FIG. 19. As shown in FIG. 19, the variable KG is proportional to the centripetal acceleration until the centripetal acceleration GY is a predetermined value (e.g., 0.1g; g is the gravitational acceleration), and is set to be "1" when it exceeds the predetermined value.

Wheel velocities of driven wheels detected by wheel velocity sensors 13 and 14 are input to a low vehicle velocity selecting section (SL) 76, so that a smaller wheel velocity is selected. Furthermore, the wheel velocities of the driven wheels detected by the wheel velocity sensors 13 and 14 are input to a high vehicle velocity selecting section (SH) 77, so that a higher wheel velocity is selected. The lower wheel velocity selected by the SL 76 is multiplied with a variable Kr by a weighting section 78, and the larger wheel velocity selected by the SH 77 is multiplied with a variable (1−Kr) by a weighting section 79. The variable Kr is set by a Kr setting section 781 and changes between "1" and "0" in accordance with the centripetal acceleration GY, as shown in FIG. 20.

The wheel velocities output from the weighting sections 78 and 79 are added to each other by an adder 80 to obtain a driven wheel velocity VR. The driven wheel velocity VR is multiplied with (1+a) by a multiplier 801 to obtain a target driving wheel velocity V$\phi$.

The target driving wheel velocity V$\phi$ output from the multiplier 801 is subtracted from the driving wheel velocity VF output from the adder 75 by a subtractor 81 to calculate a slip value DVi' (=VF−V$\phi$). The slip value DVi' is corrected by an adder 82 in accordance with the centripetal acceleration GY and a changing value $\Delta$GY of the centripetal acceleration GY as a function time. The changing value $\Delta$GY of the centripetal acceleration GY is calculated at $\Delta$Y calculating section 841. More of specifically, the slip correction value Vg which changes in accordance with the centripetal acceleration GY shown in FIG. 21 is set in a slip value correction section 83, and the slip correction value Vd which changes in accordance with the changing value $\Delta$GY of the centripetal acceleration GY as shown in FIG. 22 is set in a slip value correction section 84. The slip correction values Vd and Vg are added to the slip value DVi' output from the subtractor 81 by the adder 82 to obtain a slip value DVi.

The slip value DVi is supplied to a calculating unit 85a in a TSn calculating section 85 every 15-ms sampling time T. The slip values DVi are integrated while being multiplied with a coefficient KI, thereby calculating a correction torque TSn'. That is, a correction torque obtained by integrating the slip values DVi, i.e., an integral correction torque TSn' is calculated as follows:

TSn'=$\Sigma$KI·DVi (KI is the coefficient which changes in accordance with the slip value DVi)

The integral correction torque TSn' is a correction value for a torque driving the driving wheels WFR and WFL, and a control gain must be adjusted in accordance with a change in characteristics of a power transmission mechanism between an engine 16 and the driving wheels upon switching of a shift position. Therefore, the correction torque TSn' is respectively multiplied with coefficients GKi according to a shift position detected by a shift position detecting section 861, thereby calculating the integral correction torque TSn which is corrected in accordance with the shift position.

The slip value DVi is supplied to a calculating unit 86a of a TPn calculating section 86 every sampling time T so as to calculate a correction torque TPn' proportional to the slip value DVi. That is, a correction torque proportional to the slip value DVi, i.e., a proportional correction torque TPn' is calculated as follows:

$$TPn' = DVi \cdot Kp$$

(Kp is the coefficient which changes in accordance with the slip value DVi)
The proportional correction torques TPn' are respectively multiplied with different coefficients GKp according to a shift position detected by a shift position detecting section 86l for the same reason as the integral correction torque TSn', thus obtaining a proportional correction torque TPn which is corrected according to the shift position.

When a shift-up operation is detected on the basis of the shift signal SHT input to the traction controller 15, the coefficients GKi and GKp are switched to those after shift change operation after the setting time t2 has been measured by the timer t2 after detection. When a shift-down operation is detected on the basis of the shift signal SHT, the coefficients GKi and GKp are immediately switched.

The driven wheel velocity VR output from the adder 80 is input to a reference torque calculating section 87 as a vehicle velocity VB. In a vehicle acceleration calculating unit 87a of the reference torque calculating section 87, an acceleration VB' (GB) of the vehicle velocity is calculated.

The vehicle acceleration VB' (GB) calculated by the vehicle acceleration calculating unit 87a is filtered through a filter 87b to obtain a vehicle acceleration GBF. In the filter 87b, when a slip rate S shown in FIG. 31 is in a state corresponding to a position "1" and when an acceleration is increased, control is quickly shifted to a state corresponding to a position "2". Therefore, $GBF_{n-1}$ as an immediately preceding output of the filter 87b and presently detected $GB_n$ are similarly weighted and averaged:

$$GBF_n = (GB_n + GBF_{n-1})/2 \quad (1a)$$

When the slip rate S>Sl (Sl is set to be a value slightly smaller than a slip rate Smax yielding a maximum coefficient friction ccefficient $\mu$) and an acceleration is decreased, e.g., when the slip rate S is shifted from the position "2" to a position "3", the filter 87b is switched to a slower filter. That is, $$GBF_n = (GB_n + 7GBF_{n-1})/8 \quad (2a)$$

In this equation, the immediately preceding output $GBF_{n-1}$ of the filter 87b is weighted by a larger value.

When the slip rate S≦Sl and an acceleration is decreased, i.e., when an acceleration is decreased in a region "1", control according to a state of Smax should be held as much as possible, the filter 87b is switched to a further slower filter. That is, $$GBF_n = (GB_n + 15GBF_{n-1})/16 \quad (3)$$

The immediately preceding output $GBF_{n-1}$ of the filter 87b is weighted by a much larger value. In this manner, the filter 87b is switched in three ways as shown in equations (1a), (2a), and (3) in accordance with the slip rate and an acceleration state. The vehicle acceleration GBF is supplied to a reference torque calculating unit 87c to calculate a reference torque TG given by:

$$TG = GBF \times W \times Re$$

where W is the vehicle weight and Re is the wheel radius.

The integral correction value TSn is subtracted from the reference torque TG by a subtractor 88, and the proportional correction torque TPn is subtracted from the output from the subtractor 88 by a subtractor 89. In this manner, the target torque T$\phi$ is calculated by T$\phi$=TG−TSn−TPn.

Since the target torque T$\phi$ indicates a torque for driving the driving wheels WFR and WFL, it is divided by a total gear ratio between the engine 16 and the driving wheels to be converted to a target engine torque. A lower limit setting section 911 provides the lower limit Tlim of an engine torque to a limiter 91, the lower limit of a target engine torque T$\phi$' is limited by the lower limit Tlim which changes in accordance with a lapse of time from the beginning of traction control or the vehicle velocity VB as shown in FIG. 32 or 33. The target engine torque T$\phi$' whose lower limit is limited by the limiter 91 is supplied to a torque/throttle opening converter 92, thereby obtaining an opening $\theta$s of the sub throttle valve for generating the target engine torque T$\phi$'. The sub throttle valve THs is controlled by an actuator controller 67 so that the engine output torque has the target engine torque T$\phi$.

The wheel velocities VRR and VRL of the driven wheels are supplied to a centripetal acceleration calculating section 112e of the drive state detecting section 112 to obtain a centripetal acceleration GY' to judge a degree of turning. The centripetal acceleration GY' is supplied to a centripetal acceleration correction section 112f, and is corrected in accordance with the vehicle velocity detected by a detector 1.

More specifically, GY=KV·GY' is calculated. The coefficient KV changes in accordance with the vehicle velocity as shown in FIGS. 23 to 28, so that the centripetal acceleration GY is corrected in accordance with the vehicle velocity.

A larger driven wheel velocity output from the SH 77 is subtracted from the driving wheel velocity VFR by a subtractor 95. Furthermore, the larger driven wheel velocity output from the SH 77 is subtracted from the driving wheel velocity VFL by a subtractor 96.

The output from the subtractor 95 is multiplied with KB (0<KB<1) by a multiplier 97, and the output from the subtractor 96 is multiplied with (1−KB) by a multiplier 98. Thereafter, the outputs from the multipliers 97 and 98 are added to each other by an adder 99 to obtain a slip value DVFR for the right driving wheel. Similarly, the output from the subtractor 96 is multiplied with KB by a multiplier 100, and the output from the subtractor 95 is multiplied with (1−KB) by a multiplier 101. Thereafter, the outputs from the subtractors 100 and 101 are added to each other by an adder 102 to obtain a slip value DVFL for the left driving wheel. The variable KB is set by a KB setting section 971 and its changes in accordance with a lapse of time from start of traction control, as shown in FIG. 29. Upon start of traction control, the variable KB is set to be "0.5", and approaches "0.8" as the traction control progresses. For example, when KB=0.8, if one driving wheel slips, it is recognized that the other driving wheel slips by a value 20% of one driving wheel, and braking control is performed accordingly. If the brakes of the left and right driving wheels are independent of each other, when one driving wheel is braked and its rotational speed is decreased, the opposite driving wheel slips in turn upon operation of a differential gear, and is then braked. This operation is undesirably alternately repeated. The slip value DVFR of the right driving wheel is differentiated by a differential section 103 to calculate its changing value as a function of time, i.e., a slip changing value GFR. The slip value DVFL of the left driving wheel is differentiated by a differential section 104 to calculate its changing value as a function of time, i.e., a slip changing value GFL. The slip changing value GFR is supplied to a braking hydraulic pressure variation $\Delta P$ calculating section 105 to obtain a braking hydraulic pressure variation $\Delta P$ for suppressing the slip changing value GFR with reference to a GFR (GFL)–$\Delta P$ conversion map shown in FIG. 30. Similarly, the slip changing value GFL is supplied to a braking hydraulic pressure variation $\Delta P$ calculating section 106 to obtain a braking hydraulic pressure variation $\Delta P$ for suppressing the slip changing value GFL with reference to the GFR (GFL)–$\Delta P$ conversion map shown in FIG. 30.

The braking hydraulic pressure variation $\Delta P$, output from the $\Delta P$ calculating section 105 for suppressing the slip changing value GFR is supplied to a $\Delta P$–T converter 107 for calculating open times T of an inlet valve 17i and an outlet valve 17o through a switch BSW. When the variation $\Delta P$ is a positive value, the open time of the inlet valve 17i is calculated, and when the variation $\Delta P$ is a negative value, the open time of the outlet valve 17o is calculated. The calculated open time is used as a braking time FR for the right driving wheel.

107a is a right drive time accumulating section. This section 107a calculates an accumulation value $\Sigma$Tir of drive times of the right inlet valve 17i set every predetermined period from the signal b is outputted until an immediately preceding period, and an accumulation value $\Sigma$Tor of drive times of the right outlet valve 17o set every predetermined period. The accumulation values $\Sigma$Tir and $\Sigma$Tor are sent to a right drive time correcting section 107b. the section 107b calculates an invalid liquid amount correction value $\Delta$TR (=KT·$\Sigma$Tor−$\Sigma$Tir), KT is constant. Thereafter, the open time T of the inlet valve 17i calculated by the $\Delta P$–T converter 107 is added to the invalid liquid amount correction value $\Delta$TR in control by an adder 107c, and the open time T of the outlet valve 17o is directly output to be used as the breaking time FR of the right driving wheel WFR. Then, the driving time of the inlet valve 17i and the outlet valve 17o is controlled by a valve controller 107d.

The braking hydraulic pressure variation $\Delta P$, output from the $\Delta P$ calculating section 10b for suppressing the slip changing value GFL is supplied to a $\Delta P$–T converter 108 for calculating open times T of the inlet valve 18i and the outlet valve 18o through a switch BSW.

108a is a left drive time accumulating section. This section 108a calculates an accumulation value $\Sigma$Til of drive times of the right inlet valve 18i set every predetermined period from the signal b is outputted until an immediately preceding period, and an accumulation value $\Sigma$Tor of drive times of the right outlet valve 18o set every predetermined period. The accumulation values $\Sigma$Til and $\Sigma$Tol are sent to a left drive time correcting section 108b. the section 108b calculates an in valid liquid amount correction value $\Delta$TR (=KT·$\Sigma$Tol−$\Sigma$Til), KT is constant. Thereafter, the open time T of the inlet valve 18i calculated by the $\Delta P$–T converter 108 is added to the invalid liquid amount correction value $\Delta$TL in control by an adder 108c, and the open time T of the outlet valve 18o is directly output to be used as the breaking time FL of the left driving wheel WFL. Then, the driving time of the inlet valve 18i and the outlet valve 18o is controlled by a valve controller 108d.

The correction value corrects a delay time from when a brake liquid amount is increased until a brake begins to function. In this case, $\Delta$TR(L) can be maximum of 40 ms to correct delay time, it is clipped at 40 ms.

In FIG. 30, when braking is performed during turning, the variation $\Delta P$ in the inner wheel side detected by the inner wheel detecting section 112h during turning is as indicated by a broken line a in order to increase a braking force of the inner driving wheel.

The operation of the traction control apparatus for a vehicle according to the second embodiment of the present invention will now be described. In FIG. 17A and FIGS. 18A and 18C, the wheel velocities of the driven wheels (rear wheels) output from wheel velocity sensors 13 and 14 are input to the SH 77, the SL 76, and the centripetal acceleration calculating section 93. The SL 76 selects a lower one of the wheel velocities of the left and right driven wheels. The SH 77 selects a higher one of the wheel velocities of the left and right driven wheels. In a normal straight travel state, if the wheel velocities of the left and right driven wheels are equal to each other, the safe wheel velocity is selected and output from the SL 76 and the SH 77. The centripetal acceleration calculating section 93 receives the wheel velocities of the left and right driven wheels, and calculates a degree of turning on the basis of the wheel velocities of the left and right driven wheels, i.e., a degree indicating immediate turning.

The way of calculating the centripetal acceleration in the centripetal acceleration calculating section 93 will be described below. In a front-wheel drive vehicle, since the rear wheels are driven wheels, a vehicle velocity at that position can be detected by wheel velocity sensors regardless of slippage by driving, an Ackerman geometry can be utilized. In a normal turning state, a centripetal acceleration GY' is given by:

$$GY' = v^2/r \quad (4)$$

(v=vehicle velocity, r=turning radius)

Figure 35:
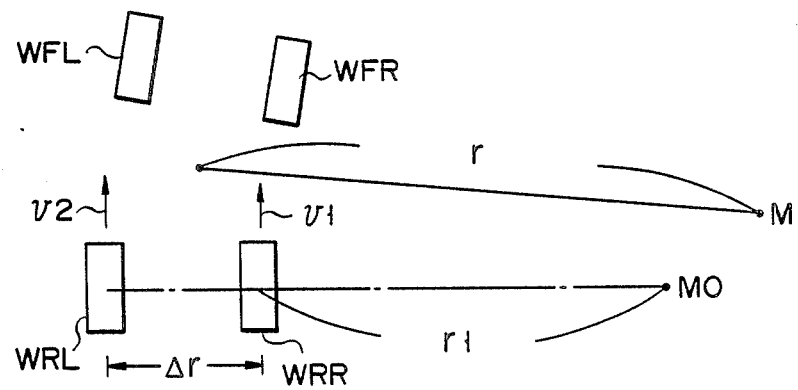
FIG. 35 is a view showing a state of a vehicle when it is turned.

For example, when the vehicle turns to the right, as shown in FIG. 35, if the center of turn is represented by M0, a distance from the center M0 of turn to an inner wheel (WRR) is represented by r1, a tread is represented by $\Delta$r, a wheel velocity of the inner wheel (WRR) is represented by v1, and a wheel velocity of an outer wheel is represented by v2, the following relation is established:

$$v2/v1 = (\Delta r + r1)/r1 \quad (5)$$

Equation (5) can be modified as follows:

$$1/r1 = (v2 - v1)/(\Delta r \cdot v1) \quad (6)$$

The centripetal acceleration GY' with reference to the inner wheel is given by:

$$GY = v1^2/r1 \quad (7)$$
$$= v1^2 \cdot (v2 - v1)/(\Delta r \cdot v1)$$
$$= v1 \cdot (v2 - v1)/\Delta r$$

The centripetal acceleration GY' can be calculated by equation (7). During turning, since the wheel velocity v1 of the inner wheel is lower than the wheel velocity v2 of the outer wheel, the centripetal acceleration GY' is calculated using the wheel velocity v1 of the inner wheel, and the centripetal acceleration GY' is calculated to be smaller than an actual one. Therefore, the coefficient KG multiplied in the weighting section 73 becomes a smaller value as the centripetal acceleration GY' is estimated smaller. Since the driving wheel velocity VF is estimated smaller, the slip value DV' (VF−Vφ) is also estimated smaller. Thus, the target engine torque is estimated larger to provide a sufficient drive force during turning.

Figure 24:
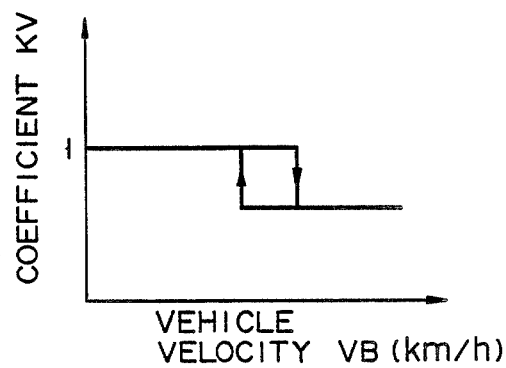
Figure 25:
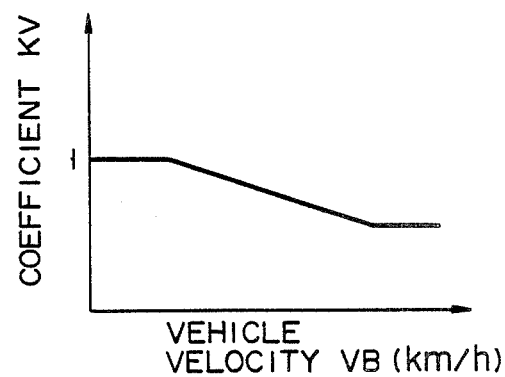

When a vehicle travels at a very low velocity, the distance between the inner wheel and the center M0 of turn is r1. However, in a vehicle which tends to be understeered as a velocity is increased, the center of turn is shifted to M, and its distance becomes r (r>r1). When the velocity is increased in this manner, since the radius of turn is calculated as r1, the centripetal acceleration GY' calculated on the basis of equation (7) becomes larger than an actual one. For this reason, the centripetal acceleration GY' calculated by the centripetal acceleration calculating section 112e is supplied to the centripetal acceleration correction section 112f, and is multiplied with the coefficient KV shown in FIG. 23 so that the centripetal acceleration GY' is decreased at a high velocity. The variable KV is set to be smaller as the vehicle velocity is increased, and may be set, as shown in FIG. 24 or 25. In this manner, the centripetal acceleration correction section 112f outputs the corrected centripetal acceleration GY as the centripetal acceleration GY' as the centripetal acceleration GY.

Figure 26:
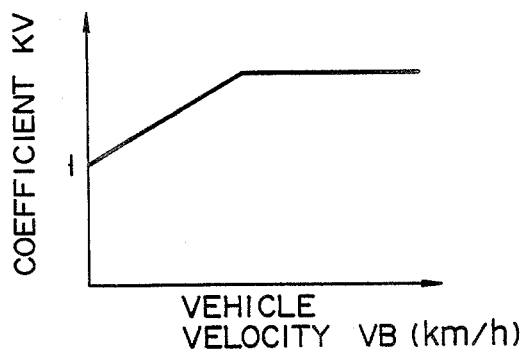
Figure 27:
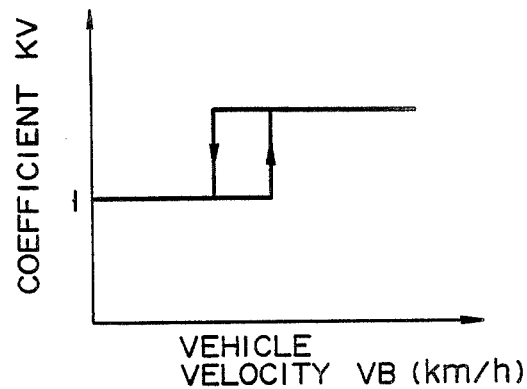
Figure 28:
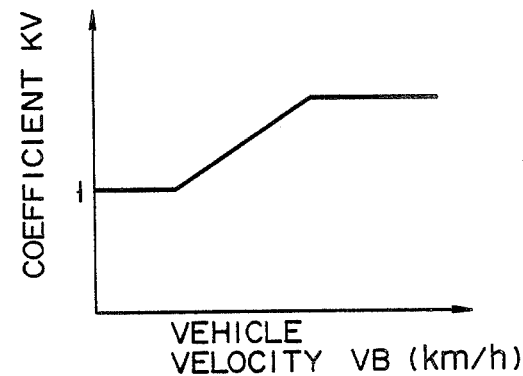

In a vehicle which tends to be oversteered (r<r1) as a vehicle velocity is increased, correction opposite to that for the vehicle which tends to be understeered is performed by the centripetal acceleration correction section 94. That is, one of the variables KV shown in FIGS. 26 to 28 is used, and the centripetal acceleration GY' calculated by the centripetal acceleration calculating section 93 is corrected to be increased as the vehicle velocity is increased.

The lower wheel velocity selected by the SL 76 is multiplied with the variable Kr shown in FIG. 20 by the weighting section 78, and the higher wheel velocity selected by the SH 77 is multiplied with the variable (1−Kr) by the weighting section 79. The variable Kr is set to be "1" during turning wherein the centripetal acceleration GY becomes larger than 0.9 g, and is set to be "0" when the centripetal acceleration GY becomes smaller than 0.4 g.

Therefore, during turning wherein the centripetal acceleration GY becomes larger than 0.9 g, the lower driven wheel velocity output from the SL 76, i.e., the wheel velocity of the inner wheel upon steering is selected. The wheel velocities output from the weighting sections 78 and 79 are added to each other by the adder 80 to obtain the driven wheel velocity VR. The driven wheel velocity VR is multiplied with (1+α) by the multiplier 801 to obtain the target driving wheel velocity Vφ.

Figure 34:
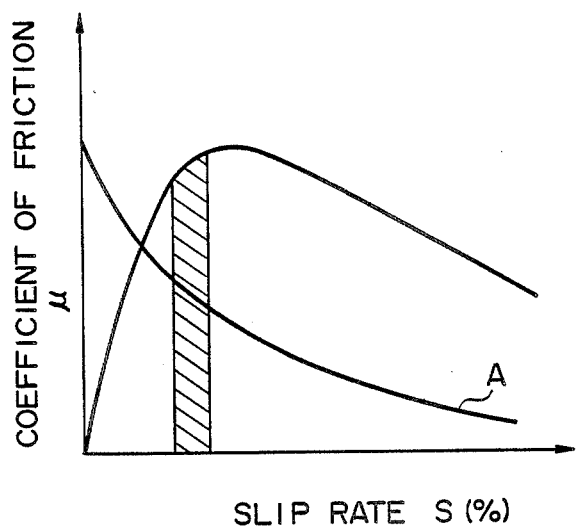

After the higher one of the driving wheel velocities is selected by the SH 71, it is multiplied with the variable KG shown in FIG. 19 by the weighting section 73. Furthermore, the average vehicle velocity (VFR+VFL)/2 of the driving wheels calculated by the averaging section 72 is multiplied with (1−KG) by the weighting section 74, and is added to the output from the weighting section 73 by the adder 75 to obtain the driving wheel velocity VF. Therefore, if the centripetal acceleration GY exceeds 0.1 g, since KG=1, a higher one of the two driving wheel velocities output from the SH 71 is output. More specifically, if the degree of turning of the vehicle is increased and the centripetal acceleration GY exceeds 0.9 g, since KG =Kr =1, an outer driving wheel velocity as a higher wheel velocity is set to be the driving wheel velocity VF, and an inner driven wheel velocity as a lower wheel velocity is set to be the driven wheel velocity VR. The slip value DVi' calculated by the subtractor 81 is given by VF−Vφ, the slip value DVi' is estimated larger. Therefore, since the target torque Tφ is estimated smaller, the engine output is reduced, and the slip rate S is decreased to increase a lateral force A, as shown in FIG. 34. Therefore, a gripping force of the wheels during turning can be increased, thus guaranteeing safe turning.

The slip value DV' is added with the slip correction value Vg shown in FIG. 21 by the slip value correction section 83 and added with the slip value Vd shown in FIG. 22 by the slip value correction section 84 only when the vehicle turns while the centripetal acceleration GY is generated. For example, assuming a 90° turn, the centripetal acceleration GY and its changing value ΔGY are positive values in the first half of turning. However, in the second half of turning, the changing value ΔGY of the centripetal acceleration GY becomes a negative value. Therefore, in the first half of turning, the slip value DVi' is added to the slip correction value Vg (>0) shown in FIG. 21 and the slip correction value Vd (>0) shown in FIG. 22 by the adder 82 to obtain the slip value DVi. In the second half of turning, the slip correction value Vg (>0) and the slip correction value Vd (<0) are added to the slip value DVi' to obtain the slip value DVi. The slip value DVi in the second half of turning can be estimated to be smaller than that in the first half of turning. In the first half of turning, the engine output is decreased to increase a lateral force to improve turning characteristics. In the second half of turning, the engine output is recovered relative to the first half to improve acceleration characteristics after turning is terminated.

The corrected slip value DVi is supplied to the TSn calculating section 85 every 15-ms sampling time T. In the TSn calculating section 85, the slip values DVi are integrated while being multiplied with the coefficient KI, thereby obtaining the correction torque TSn. That is, $$TSn = GKi \cdot \Sigma KI \Sigma DVi$$

(KI is the coefficient which changes in accordance with the slip value DVi)

In this manner, a correction torque obtained by integrating the slip values DVi, i.e., the integral correction torque TSn can be obtained.

The slip value DVi is supplied to the TPn calculating section 86 every sampling time T, thus calculating the correction torque TPn. That is, $$TPn = GKp \cdot DVi \cdot Kp$$

(Kp is the coefficient which changes in accordance with the slip value DVi)
Thus, a correction torque proportional to the slip value DVi, i.e., the proportional correction torque TPn is calculated.

The values of the coefficients GKi and GKp used in calculations of the coefficient multipliers 85b and 86b are switched to values corresponding to a shift position after a shift change operation after the set time t2 has passed from the beginning of the shift change operation in a shift-up mode. A given time is required from beginning of the shift change operation until the shift position is actually switched and the shift change operation is completed. In the shift-up mode, if the coefficients GKi and GKp corresponding to the higher shift position after the shift change operation are used immediately after the shift change operation is started, the values of the correction torques TSn and TPn become values corresponding to the higher shift position. Therefore, the correction torques become smaller than those before the shift change operation is started although an actual shift change operation is not completed, and hence, the target torque Tφ is increased. Thus, slippage is induced, resulting in unstable control.

The driven wheel velocity VR output from the adder 80 is input to the reference torque calculating section 87 as the vehicle velocity VB. The vehicle acceleration calculation unit 87a then calculates the acceleration VB' (GB) of the vehicle. The acceleration GB of the vehicle calculated by the vehicle acceleration calculating unit 87a is filtered according to one of equations (1) to (3) by the filter 87b, as has been described in the description of the arrangement of the filter 87b, so that GBF is optimally held in accordance with the state of the acceleration GB. In the reference torque calculating unit 87c, the reference torque TG ($=GBF \times W \times Re$) is calculated.

The integral correction torque TSn is subtracted from the reference torque TG by the subtractor 88 and the proportional correction torque TPn is subtracted from the reference torque TG from the subtractor 88 by the subtractor 89. In this manner, the target torque Tφ is calculated by $T\phi = TG - TSn - TPn$.

The target torque Tφ is converted to the target engine torque Tφ' by the engine torque calculating section 90. In the lower limit setting section 91 which provides the lower limit Tlim of the engine torque, the lower limit of the target engine torque Tφ' is limited by the lower limit Tlim which changes in accordance with the lapse of time from start of traction control or the vehicle velocity VB, as shown in FIG. 32 or 33. More specifically, at the beginning of traction control or when the reference torque TG fails to detect at a low velocity, the value of the torque lower limit Tlim is set to be slightly larger as shown in FIG. 32 or 33, and the engine torque Tφ' exceeding a torque causing no slippage can be output, thus assuring good acceleration characteristics. When the engine torque Tφ' exceeding a torque causing no slippage is output and slippage occurs, generation of slippage is suppressed by braking control.

The target engine torque Tφ whose lower limit is limited by the limiter 91 is supplied to the torque/throttle opening converter 92, and the opening θs of the sub throttle valve for generating the target engine torque Tφ' is obtained. An opening θs of the sub throttle valve is adjusted by the actuator controller 67, so that the engine output torque has the target engine torque Tφ'.

The larger driven wheel velocity output from the SH 87 is subtracted from the driving wheel velocity VFR by the subtractor 95. Furthermore, the higher driven wheel velocity output from the SH 87 is subtracted from the driving wheel velocity VFL by the subtractor 96. Therefore, the outputs from the subtractors 95 and 96 are estimated smaller. Even when a difference between left and right driven wheel velocities is generated by an inner wheel difference during turning, a braking operation due to an erroneous detection of slippage can be prevented, thus improving travel stability.

The output from the subtractor 95 is multiplied with KB ($0 < KB < 1$) by the multiplier 97, and the output from the subtractor 96 is multiplied with $(1 - KB)$ by the multiplier 98. Thereafter, the outputs from the multipliers 97 and 98 are added to each other by the adder 99 to obtain the slip value DVFR of the right driving wheel. At the same time, the output from the subtractor 96 is multiplied with KB by the multiplier 100, and the output from the subtractor 95 is multiplied with $(1 - KB)$ by the multiplier 101. Thereafter, the outputs from the multipliers 100 and 101 are added to each other by the adder 102 to obtain the slip value DVFL of the left driving wheel. As shown in FIG. 29, the variable KB changes in accordance with a lapse of tim from the beginning of traction control. The variable KB is set to be "0.5" at the beginning of the traction control, and approaches "0.8" as the traction control progresses. More specifically, when slippage of the driving wheels is eliminated by braking, both the wheels are braked at the same time at the beginning of braking, so that an uncomfortable steering shock at the beginning of braking on, e.g., a split road can be eliminated. An operation when the braking control continues and KB becomes "0.8" will be described below. In this case, if one driving wheel slips, it is recognized that the other driving wheel also slips by a value 20% of one driving wheel, and braking control is performed accordingly. If the brakes of the left and right driving wheels are independent of each other, when one driving wheel is braked and its rotational speed is decreased, all the driving torque is transmitted to the opposite driving wheel, and the opposite driving wheel slips in turn upon operation of a differential gear and is then braked. This operation is undesirably alternately repeated. The slip value DVFR of the right driving wheel is differentiated by the differential section 103 to calculate its changing value as a function of time, i.e., the slip changing value GFR. The slip value DVFL of the left driving wheel is differentiated by the differential section 104 to calculate its changing value as a function of time, i.e., the slip changing value GFL. The slip changing value GFR is supplied to the braking hydraulic pressure variation ΔP calculating section 105 to obtain the braking hydraulic pressure variation ΔP for suppressing the slip changing value GFR with reference to the GFR (GFL)−ΔP conversion map shown in FIG. 30. Similarly, the slip changing value GFL is supplied to the braking hydraulic pressure variation ΔP calculating section 106 to obtain the braking hydraulic pressure variation ΔP for suppressing the slip changing value GFL with reference to the GFR (GFL)−ΔP conversion map shown in FIG. 30.

The braking hydraulic pressure variation ΔP, output from the ΔP calculating section 105 for suppressing the slip changing value GFR is supplied to the ΔP−T convertor 107, and the open time of the inlet valve 17*i* or the open time of the outlet valve 17*o* is calculated. The calculated open time is used as the braking time FR for the right driving wheel, and the left driving wheel WFR is braked. Similarly, the braking hydraulic pressure variation ΔP, output from the ΔP calculating section 106, for suppressing the slip changing value GFL is supplied to the ΔP−T converter 108, and the open time of the inlet valve 18*i* or the open time of the outlet valve 18*o* is calculated. The calculated open time is used as the braking time FL for the left driving wheel, and the left driving wheel WFL is braked. Then, valves 17*i*, 17*o*, 18*i*, 18*o*, 202R, 202L are controlled by the valve controllers 107*d*, 108*d*.

In FIG. 30, when braking is performed during turning, the variation ΔP of the inner wheel side during turning is as indicated by a broken line a in order to enhance braking of the inner driving wheel. During turning, the inner wheel tends to slip since a load is shifted toward the outer wheel side. This can be prevented such that the braking hydraulic pressure variation ΔP of the inner wheel is increased to be larger than that of the outer wheel.

In the second embodiment, the coefficients GKi and GKp used in calculations by the coefficient multipliers 85*b* and 86*b* are switched to values according to a shift position upon completion of the shift change operation after the lapse of a setting time from the beginning of the shift change operation in a shift-up mode. Switching in the shift-up mode may be performed upon completion of the shift change operation, and switching in a shift-down mode may be performed at the beginning of the shift change operation. In this manner, the target engine torque Tφ' in the shift-up or shift-down mode is suppressed to prevent induction of slippage.

In the filter 87*b*, when the slip rate $S \leq S1$ and the acceleration is decreased, the filter of equation (3) is selected. The vehicle acceleration GB may be held without using the filter of equation (3). The filter of equation (1) is used when the acceleration is increased. At a very low vehicle velocity (VB<3 km/h), a slow filter may be defined as:
$GBF_n = (GB_n + 3GBF_{n-1})/4$ At a normal vehicle velocity (VB>3 km/h), a fast filter may be defined as:

$$GBF_n = (GB_n + GBF_{n-1})/2$$

In the lower limit setting section 91, when the degree of turning is increased, i.e., when the centripetal acceleration GY is increased, the lower limit Tlim may be decreased. That is, $$Tlim = Tlim - \alpha \cdot GY (\geq 0)$$

(α is the coefficient)
Thus, generation of any slippage during turning is prevented, and a large lateral force is maintained. A vehicle can be prevented from being deviated due to small slippage during turning.

In the second embodiment, the calculation of the centripetal acceleration GY' in the centripetal acceleration calculating section 93 is made with reference to the inner wheel velocity v1. However, the present invention is not limited to this. For example, the calculation may be made with reference to an average of the inner and outer wheel velocities v1 and v2 or with reference to the outer wheel velocity v2.

For example, a case will be described below wherein the centripetal acceleration GY' is calculated with reference to an average value of the inner and outer wheel velocities v1 and v2. In this case, when v=v2+v1/2 and r=(r1+Δr)/2 are substituted in equation (4) and equation (4) is modified using equation (5), the centripetal acceleration GY' is expressed by:

$$GY' = (v2^2 - v1^2)/2 \cdot \Delta r \quad (8)$$

On the other hand, when the calculation is made with reference to the outer wheel velocity v2, if v=v2 and r=r1+Δr are substituted in equation (4) and equation (4) is modified using equation (5), the centripetal acceleration GY' is expressed by:

$$GY' = (v2 - v1)v2/\Delta r \quad (9)$$

Therefore, when the centripetal acceleration GY' is calculated with reference to the outer wheel velocity v2, it is estimated higher than an actual one, and hence, the slip value DV' is also estimated larger than an actual one. Therefore, the target torque Tφ is estimated smaller, and the engine output torque is reduced than required, thus increasing a lateral force and improving turning characteristics. When the centripetal acceleration GY' is calculated with reference to the average value of the inner and outer wheel velocities v1 and v2, intermediate engine output control between a case using the inner wheel velocity v1 and a case using the outer wheel velocity v2 is made. Therefore, the driving force and turning characteristics during turning are equally emphasized.

Figure 36:
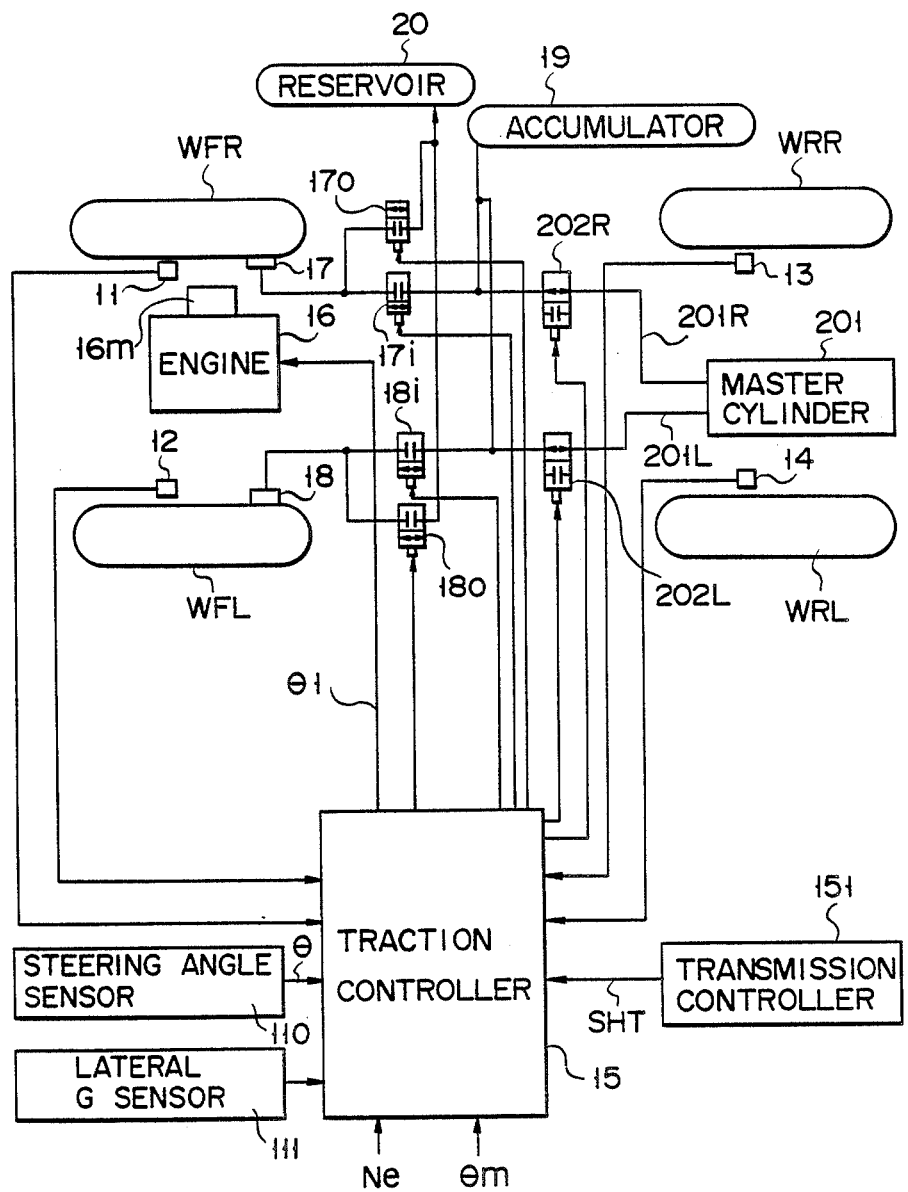
FIG. 36 is a diagram showing an overall arrangement of a traction control apparatus according to a third embodiment of the present invention.

A traction control apparatus according to a third embodiment of the present invention will now be described with reference to FIGS. 36 to 39. The third embodiment corresponds to a modification of the second embodiment described above with reference to FIGS. 17A to 36. That is, the third embodiment is substantially the same as the second embodiment except that the diagram shown in FIG. 36 is used in place of that shown in FIG. 17A and the drive state detecting section 112 of FIG. 39 is used in place of the shown in FIG. 18A. FIG. 37 shows the principle of a lateral G sensor 111 (112*i*) shown in FIG. 36, and FIG. 38 shows output voltage characteristics of the lateral G sensor 111.

Figure 17A:
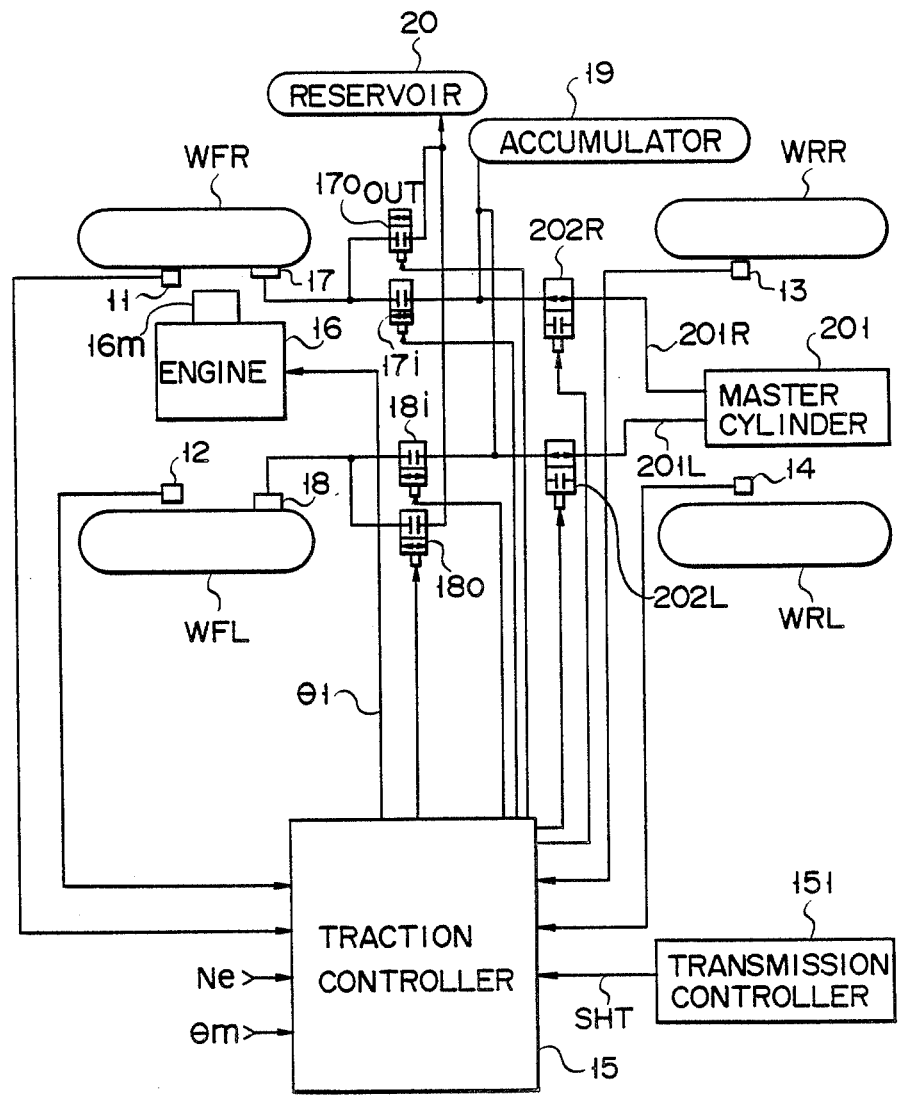
FIG. 17A is a diagram showing an overall arrangement of a traction control apparatus according to a second embodiment of the present invention.
Figure 17B:
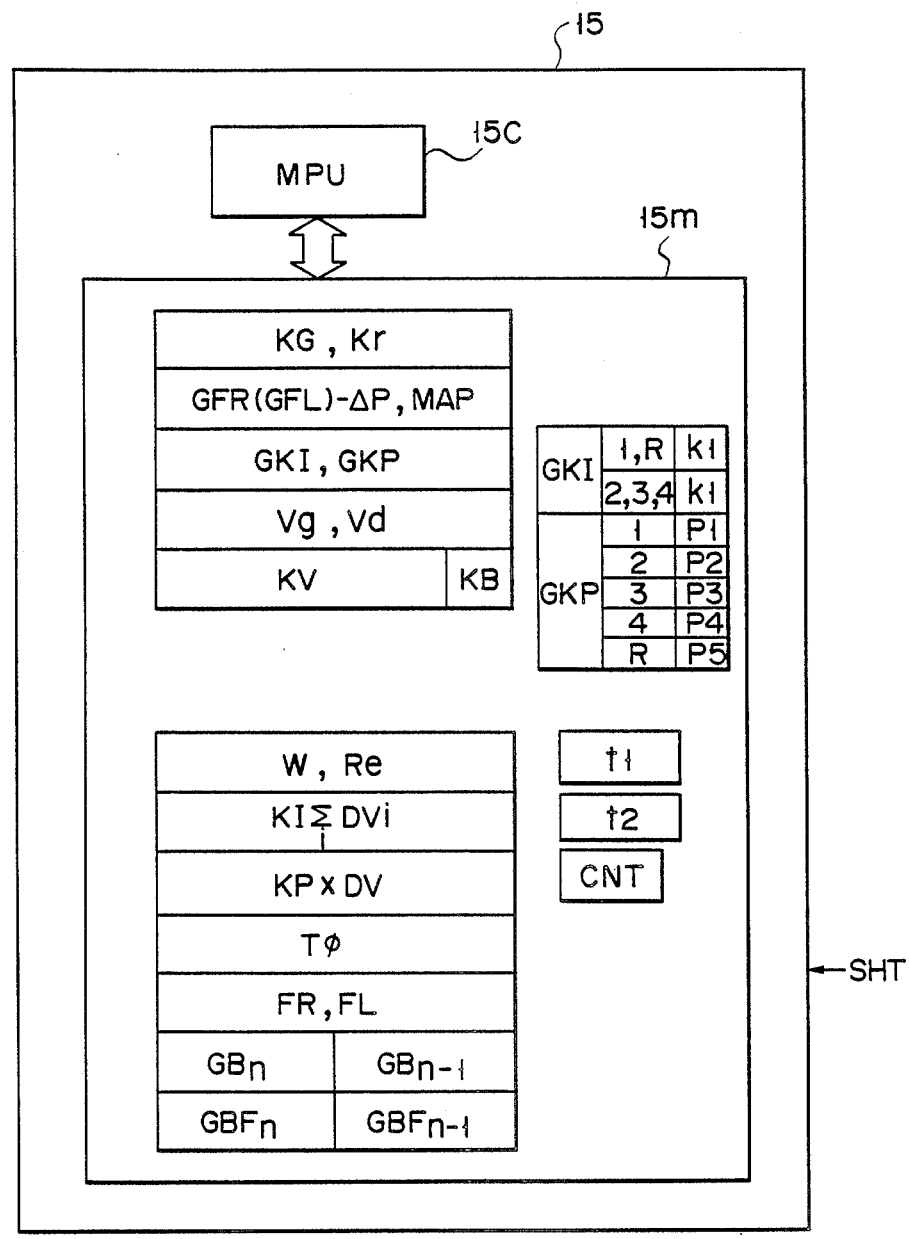
FIG. 17B is a diagram showing a detailed arrangement of a traction controller shown in FIG. 17A.

The same reference numerals in FIG. 36 denote the same parts as in FIG. 17A, and a detailed description thereof will be omitted. In FIG. 36, reference numeral 110 (112*k*) denotes a steering angle sensor for detecting a steering speed of a steering wheel; and 111 (112*i*), a lateral G sensor for detecting a lateral acceleration applied to a vehicle. A steering angle θ of a steering wheel detected by the steering angle sensor 110 and a lateral acceleration detected by the lateral G sensor 111 are input to a traction controller 15 as amounts indicating a degree of turning, i.e., turning degree.

FIG. 37 shows the principle of the lateral G sensor 111. The lateral G sensor 111 is an operational transformer type displacement detection sensor. A core 120 is arranged between a primary coil 121 and two secondary coils 122*a* and 122*b* to be movable in a lateral direction of a vehicle. With this arrangement, when the vehicle turns and a lateral acceleration is increased, the core 120 is displaced in the lateral direction in accordance with the lateral acceleration, and an output voltage E shown in FIG. 38 is generated. More specifically, when the output voltage I! is measured, the lateral acceleration applied to the vehicle, i.e., the turning degree, can be detected. The lateral acceleration corresponds to the centripetal acceleration GY. In the third embodiment, the lateral acceleration detected by the lateral G sensor 111 is used in place of the centripetal acceleration GY in the second embodiment. When the lateral G sensor 111 malfunctions, the lateral acceleration GY output from the lateral acceleration calculator 112d is outputted through a selector 112m. The selector 112m is switch by a failure detector 112k.

The traction controller 15 receives the lateral acceleration detected by the lateral G sensor 111 as the turning degree. When the turning degree is increased, the controller 15 controls to decrease a slip rate S and increase a lateral force A during turning, thereby improving turning characteristics. However, when the lateral G sensor 111 malfunctions, the lateral acceleration GY is calculated on the basis of driven wheel velocities output from wheel velocity sensors 13 and 14 for detecting driven wheel velocities, and the slip rate S during turning is decreased on the basis of the centripetal acceleration GY, thereby improving turning characteristics. The malfunction of the lateral G sensor 111 can be detected by the failure detector 112j when one of the following conditions is satisfied:

(1) E>EH or E<EL continues for a predetermined period of time;

(2) $\theta$>+A, VB<B, and E<EO continue for a predetermined period of time; and (3) $\theta$<−A, VB>B, and E>EO continue for a predetermined period of time.

($\theta$: steering angle, VB: vehicle velocity, A, B: preset values, EH: upper limit, EL: lower limit, EO: reference value)

Thereafter, the operation for calculating the centripetal acceleration GY, and making control on the basis of the centripetal acceleration GY in accordance with the slip rate S to improve turning characteristics is the same as that in the second embodiment shown in FIGS. 18A and 18B.

In the first to third embodiments, the reference torque TG is calculated as an axial torque of the driving wheels from the driven wheel velocities, and after the correction torque according to a slip value is subtracted from the reference torque TG to calculate the target torque as an axial torque, the target torque is converted to an engine target torque. However, the reference torque and the correction torque may be calculated after they are converted to an engine torque.

What is claimed is:

1. A traction control apparatus comprising:
  acceleration slippage detecting means for, when it is detected that acceleration slippage occurs in driving wheels of a vehicle, outputting at least one of an engine control start instruction and a braking control start instruction;
  drive state detecting means for detecting a drive state of the vehicle;
  driving wheel velocity detecting means for detecting left and right driving wheel velocities of the vehicle;
  driving wheel velocity selecting means for selecting and outputting one of a driving wheel rotating speed calculated using the left and right driving wheel velocities detected by said driving wheel velocity detecting means, and said left and right driving wheel rotation speeds, in accordance with a result obtained from said drive state detecting means;
  driven wheel velocity detecting means for detecting a driven wheel velocity of the vehicle;
  reference velocity setting means for setting a reference velocity on the basis of an output from said driven wheel velocity detecting means;
  first slip value detecting means for detecting slip values of the driving wheels on the basis of difference between the outputs from said driving wheel velocity selecting means and an output from said reference velocity setting means;
  engine output control means for controlling an engine output of the vehicle in accordance with the slip values detected by said first slip value detecting means upon reception of the engine control start instruction;
  second slip value detecting means for detecting slip values of the driving wheels on the basis of differences between the outputs from the driving wheel velocity detecting means and the output from said reference velocity setting means; and
  braking force control means for controlling braking forces of the driving wheels in accordance with the slip values detected by said second slip value detecting means upon reception of the braking control start instruction.

2. An apparatus according to claim 1, wherein said driving wheel velocity selecting means selects and outputs a lower one of the left and right driving wheel velocities detected by said driving wheel velocity detecting means.

3. An apparatus according to claim 1, wherein said driving wheel velocity selecting means comprises lower driving wheel velocity selecting means for selecting and outputting a lower one of the left and right driving wheel velocities detected by said driving wheel velocity detecting means, average driving wheel velocity calculating means for calculating an average value of the left and right driving wheel velocities, coefficient setting means for determining a value between 0 and 1 to be a coefficient KG in accordance with the result obtained from said drive state detecting means, and driving wheel velocity calculating means for outputting a driving wheel velocity Vd calculated by the following equation on the basis of an output Vdl from said lower driving wheel velocity selecting means, an output Vde from said average driving wheel velocity calculating means and the output KG from said coefficient setting means:

$$Vd = (1-KG)\cdot Vdl + KG\cdot Vde$$

4. An apparatus according to claim 3, wherein said drive state detecting means detects a plurality of kinds of drive states of the vehicle, and said coefficient setting means determines values of variables which change within a range of 0 to 1 using the plurality of kinds of drive states as parameters on the basis of outputs from said drive state detecting means, and sets a maximum one of the determined variables as the coefficient KG.

5. An apparatus according to claim 4, wherein said drive state detecting means comprises vehicle velocity detecting means for detecting a travel velocity of the vehicle, and control time measuring means for measuring a time elapsed after said acceleration slippage detecting means outputs the braking control start instruction.

6. An apparatus according to claim 4, wherein said drive state detecting means comprises vehicle velocity detecting means for detecting a travel velocity of the vehicle, control time measuring means for measuring a time elapsed after said acceleration slippage detecting means outputs the braking control start instruction, and lateral acceleration detecting means for detecting a lateral acceleration generated in a widthwise direction of the vehicle.

7. An apparatus according to claim 1, wherein said drive state detecting means comprises turning state detecting means for detecting a turning state of the vehicle, when it is determined on the basis of an output from said turning state detecting means that a vehicle is turning, said driving wheel velocity selecting means selects and outputs a higher one of the left and right driving wheel velocities detected by said driving wheel velocity detecting means, and said driven wheel velocity detecting means comprises left and right driven wheel velocity detecting means for respectively detecting left and right driven wheel velocities, and higher driven wheel velocity selecting means for, when it is determined on the basis of an output from said turning state detecting means that a vehicle is turning, selecting and outputting a higher one of the left and right driven wheel velocities detected by said left and right driven wheel velocity detecting means.

8. An apparatus according to claim 1, wherein said drive state detecting means comprises turning state detecting means for detecting a turning state of the vehicle, said driving wheel velocity selecting means comprises higher driving wheel velocity selecting means for selecting and outputting a higher one of the left and right driving wheel velocities detected by driving wheel velocity detecting means, average driving wheel velocity calculating means for calculating an average value of the left and right driving wheel velocities detected by said driving wheel velocity detecting means, driving wheel side coefficient setting means for determining a value between 0 and 1 to be a coefficient KG in accordance with the output from said turning state detecting means, and driving wheel velocity calculating means for outputting a driving wheel velocity Vd calculated by the following equation on the basis of an output Vdh from said higher driving wheel velocity selecting means, an output Vde from said average driving wheel velocity calculating means and the output KG from said driving wheel side coefficient setting means:

$Vd = KG \cdot Vdh + (1-KG) \cdot Vde$ and, said driven wheel velocity detecting means comprises left and right driven wheel velocity detecting means for respectively detecting left and right driven wheel velocities, higher driven wheel velocity selecting means for selecting and outputting a higher one of the left and right driven wheel velocities detected by said left and right driven wheel velocity detecting means, lower driven wheel velocity selecting means for selecting and outputting a lower one of the left and right driven wheel velocities detected by said left and right driven wheel velocity detecting means, driven wheel side coefficient setting means for determining a value between 0 and 1 to be a coefficient Kr in accordance with the output from said turning state detecting means, and driven wheel velocity calculating means for outputting a driven wheel velocity Vr calculated by the following equation on the basis of an output Vrh from said higher driven wheel velocity selecting means, an output Vrl from said lower driven wheel velocity selecting means, and the output Kr from said driven wheel side coefficient setting means:

$Vr = (1-Kr) \cdot Vrh + Kr \cdot Vrl$

9. An apparatus according to claim 8, wherein said turning state detecting means detects a lateral acceleration generated in a widthwise direction of the vehicle.

10. An apparatus according to claim 8, wherein said driving wheel side coefficient setting means sets a value of the coefficient KG to be 1 when a degree of turning of the vehicle exceeds a predetermined first degree of turning on the basis of the output from said turning state detecting means, and said driven wheel side coefficient setting means sets a value of the coefficient Kr to be 1 when the degree of turning of the vehicle exceeds a predetermined second degree of turning which is equal to the predetermined first degree of turning or is different from the first degree of turning.

11. An apparatus according to claim 1, wherein said driven wheel velocity detecting means respectively detecting left and right driven wheel velocities of the vehicle, said reference velocity setting means comprises first reference velocity setting means for setting a first reference velocity on the basis of the left and right driven wheel velocities detected by said left and right driven wheel velocity detecting means, and second reference velocity setting means for setting a second reference velocity on the basis of the left and right driven wheel velocities detected by said left and right driven wheel velocity detecting means, said first slip value detecting means detects the slip values of the driving wheels on the basis of the differences between the outputs from said driving wheel velocity selecting means and an output from said first reference velocity setting means, and said second slip value detecting means detects the slip values of the driving wheels on the basis of the differences between the outputs from said driving wheel velocity detecting means and an output from said second reference velocity detecting means.

12. An apparatus according to claim 11, wherein said second reference velocity setting means selects a higher one of the left and right driven wheel velocities, and sets the selected velocity as the second reference velocity.

13. An apparatus according to claim 1, wherein said reference velocity setting means calculates the reference velocity on the basis of the driven wheel velocities detected by said driven wheel velocity detecting means, and corrects the reference velocity in accordance with the result obtained from said drive state detecting means.

14. An apparatus according to claim 1, wherein said drive state detecting means comprises travel acceleration detecting means for detecting a travel acceleration of the vehicle, and said reference velocity setting means comprises reference velocity calculating means for calculating the reference velocity by multiplying the driven wheel velocity detected by said driven wheel velocity detecting means with a predetermined coefficient to obtain a result and adding a predetermined correction value to the result, and reference velocity correcting means for increasing the predetermined correction value with an increase in said travel acceleration detected by said travel acceleration detecting means.

15. An apparatus according to claim 14, wherein said travel acceleration detecting means detects a changing value in driven wheel velocity detected by said driven wheel velocity detecting means as a function of time as the travel acceleration.

16. An apparatus according to claim 14, wherein a value of the predetermined coefficient is 1.

17. An apparatus according to claim 14, wherein said reference velocity calculating means calculate the reference velocity by multiplying the driven wheel velocity detected by said driven wheel velocity detecting means with a correction coefficient, and said reference velocity correcting means increases the correction coefficient with an increase in said travel acceleration detected by said travel acceleration detecting means.

* * * * *